United States Patent
Patil et al.

(10) Patent No.: US 8,528,018 B2
(45) Date of Patent: Sep. 3, 2013

(54) SYSTEM AND METHOD FOR EVALUATING VISUAL WORTHINESS OF VIDEO DATA IN A NETWORK ENVIRONMENT

(75) Inventors: Deepti Patil, San Jose, CA (US); Satish K. Gannu, San Jose, CA (US); Charles C. Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 13/098,112

(22) Filed: Apr. 29, 2011

(65) Prior Publication Data

US 2012/0278824 A1 Nov. 1, 2012

(51) Int. Cl.
*H04N 5/445* (2006.01)

(52) U.S. Cl.
USPC .................................. 725/40; 725/18; 725/46

(58) Field of Classification Search
USPC .................... 725/13–14, 18, 40, 46
See application file for complete search history.

(56) References Cited

U.S. PATENT DOCUMENTS

| | | | |
|---|---|---|---|
| 5,613,032 A | 3/1997 | Cruz et al. |
| 5,677,901 A | 10/1997 | Iwamura |
| 5,857,179 A | 1/1999 | Vaithyanathan et al. |
| 5,961,582 A | 10/1999 | Gaines |
| 6,012,053 A | 1/2000 | Pant et al. |
| 6,026,388 A | 2/2000 | Liddy et al. |
| 6,301,586 B1 | 10/2001 | Yang et al. |
| 6,304,283 B1 | 10/2001 | Kitagawa |
| 6,345,253 B1 | 2/2002 | Viswanathan |
| 6,697,793 B2 | 2/2004 | McGreevy |
| 7,017,183 B1 | 3/2006 | Frey et al. |
| 7,072,837 B2 | 7/2006 | Kemble et al. |
| 7,099,867 B2 | 8/2006 | Okada et al. |
| 7,260,312 B2 | 8/2007 | Srinivasan et al. |
| 7,292,532 B2 | 11/2007 | Sakata et al. |
| 7,350,227 B2 | 3/2008 | McGrew et al. |
| 7,417,959 B2 | 8/2008 | Dorner et al. |
| 7,457,808 B2 | 11/2008 | Gaussier et al. |

(Continued)

FOREIGN PATENT DOCUMENTS

| | | |
|---|---|---|
| CN | 102648464 A | 8/2012 |
| EP | 2483803 | 4/2011 |

(Continued)

OTHER PUBLICATIONS

U.S. Appl. No. 13/608,787, filed Sep. 10, 2012 entitled "System and Method for Enhancing Metadata in a Video Processing Environment," Inventor(s) Sandipkumar V. Shah, et al.

(Continued)

*Primary Examiner* — Kristine Kincaid
*Assistant Examiner* — Sumaiya A Chowdhury
(74) *Attorney, Agent, or Firm* — Patent Capital Group

(57) ABSTRACT

A method is provided in one example and includes evaluating a video file in a network environment; determining an identity of at least one speaker associated with the video file in order to generate an identity attribute; performing speech to text operations associated with the video file in order to generate at least one text attribute; generating a visual worthiness rating based, at least, on the identity attribute and the text attribute associated with the video file, where the visual worthiness rating is reflective of a visual significance of image content in the video file; and rendering the visual worthiness rating to the end user prior to the video file being played.

19 Claims, 8 Drawing Sheets

(56) References Cited

U.S. PATENT DOCUMENTS

| | | | |
|---|---|---|---|
| 7,493,369 | B2 | 2/2009 | Horvitz et al. |
| 7,509,491 | B1 | 3/2009 | Wainner et al. |
| 7,698,442 | B1 | 4/2010 | Krishnamurthy et al. |
| 7,706,265 | B2 | 4/2010 | Monette et al. |
| 7,809,714 | B1 | 10/2010 | Smith |
| 7,818,215 | B2 | 10/2010 | King et al. |
| 7,827,191 | B2 | 11/2010 | Williams |
| 7,853,553 | B2 | 12/2010 | Lankinen et al. |
| 7,913,176 | B1 | 3/2011 | Blattner et al. |
| 8,015,250 | B2 | 9/2011 | Kay |
| 8,051,204 | B2 | 11/2011 | Kai et al. |
| 8,214,209 | B2 | 7/2012 | Nagatomo |
| 8,260,774 | B1 | 9/2012 | Aggarwal |
| 2002/0032772 | A1 | 3/2002 | Olstad et al. |
| 2002/0035605 | A1 | 3/2002 | McDowell et al. |
| 2003/0014448 | A1 | 1/2003 | Castellanos et al. |
| 2003/0014586 | A1 | 1/2003 | Mitsuda et al. |
| 2003/0028896 | A1 | 2/2003 | Swart et al. |
| 2003/0033288 | A1 | 2/2003 | Shanahan et al. |
| 2003/0093789 | A1* | 5/2003 | Zimmerman et al. ......... 725/34 |
| 2004/0158609 | A1 | 8/2004 | Daniell et al. |
| 2004/0193426 | A1* | 9/2004 | Maddux et al. ............. 704/275 |
| 2004/0208123 | A1 | 10/2004 | Sakata et al. |
| 2005/0060283 | A1 | 3/2005 | Petras et al. |
| 2005/0068167 | A1 | 3/2005 | Boyer et al. |
| 2005/0108001 | A1 | 5/2005 | Aarskog |
| 2005/0160166 | A1 | 7/2005 | Kraenzel |
| 2006/0150253 | A1 | 7/2006 | Feuerstein et al. |
| 2007/0016583 | A1 | 1/2007 | Lempel et al. |
| 2007/0118275 | A1 | 5/2007 | Qi et al. |
| 2007/0198725 | A1 | 8/2007 | Morris |
| 2007/0239837 | A1 | 10/2007 | Jablokov et al. |
| 2007/0244892 | A1 | 10/2007 | Narancic |
| 2007/0260684 | A1 | 11/2007 | Sharma et al. |
| 2007/0266020 | A1 | 11/2007 | Case et al. |
| 2007/0294265 | A1 | 12/2007 | Askew et al. |
| 2008/0027981 | A1 | 1/2008 | Wahl |
| 2008/0065892 | A1 | 3/2008 | Bailey et al. |
| 2008/0091670 | A1 | 4/2008 | Ismalon |
| 2008/0097985 | A1 | 4/2008 | Olstad et al. |
| 2008/0126690 | A1 | 5/2008 | Rajan et al. |
| 2008/0140674 | A1 | 6/2008 | Ishikawa |
| 2008/0154873 | A1 | 6/2008 | Redlich et al. |
| 2008/0184326 | A1 | 7/2008 | Nakajima |
| 2008/0222142 | A1 | 9/2008 | O'Donnell |
| 2008/0244740 | A1 | 10/2008 | Hicks et al. |
| 2008/0295040 | A1 | 11/2008 | Crinon |
| 2009/0006333 | A1 | 1/2009 | Jones et al. |
| 2009/0049053 | A1 | 2/2009 | Barker et al. |
| 2009/0055175 | A1 | 2/2009 | Terrell et al. |
| 2009/0182727 | A1 | 7/2009 | Majko |
| 2009/0196570 | A1 | 8/2009 | Dudas et al. |
| 2009/0226870 | A1 | 9/2009 | Minotti |
| 2009/0254572 | A1 | 10/2009 | Redlich et al. |
| 2009/0276377 | A1 | 11/2009 | Dutta et al. |
| 2009/0293016 | A1 | 11/2009 | Potevin et al. |
| 2009/0319365 | A1 | 12/2009 | Waggoner et al. |
| 2009/0327271 | A1 | 12/2009 | Amitay et al. |
| 2010/0010968 | A1 | 1/2010 | Redlich et al. |
| 2010/0057815 | A1 | 3/2010 | Spivack et al. |
| 2010/0153855 | A1 | 6/2010 | Roberts et al. |
| 2010/0179801 | A1 | 7/2010 | Huynh et al. |
| 2010/0223581 | A1 | 9/2010 | Manolescu et al. |
| 2010/0223629 | A1 | 9/2010 | Appelbaum et al. |
| 2010/0250547 | A1 | 9/2010 | Grefenstette et al. |
| 2010/0274815 | A1 | 10/2010 | Vanasco |
| 2010/0280985 | A1 | 11/2010 | Duchon et al. |
| 2010/0306816 | A1 | 12/2010 | McGrew et al. |
| 2011/0077936 | A1 | 3/2011 | Arumugam et al. |
| 2011/0078167 | A1 | 3/2011 | Sundaresan et al. |
| 2011/0099195 | A1 | 4/2011 | Patwardhan et al. |
| 2011/0119264 | A1 | 5/2011 | Hu et al. |
| 2011/0161409 | A1 | 6/2011 | Nair et al. |
| 2011/0173260 | A1 | 7/2011 | Biehl et al. |
| 2011/0208522 | A1 | 8/2011 | Pereg et al. |
| 2011/0225048 | A1 | 9/2011 | Nair |
| 2011/0231296 | A1 | 9/2011 | Gross et al. |
| 2011/0252330 | A1 | 10/2011 | Catlin et al. |
| 2011/0270709 | A1 | 11/2011 | Lewis et al. |
| 2011/0304685 | A1 | 12/2011 | Khedouri et al. |
| 2012/0002544 | A1 | 1/2012 | Kokku et al. |
| 2012/0030232 | A1 | 2/2012 | John et al. |
| 2012/0046936 | A1 | 2/2012 | Kandekar et al. |
| 2012/0081506 | A1 | 4/2012 | Marvit |
| 2012/0102050 | A1 | 4/2012 | Button et al. |
| 2012/0110087 | A1 | 5/2012 | Culver et al. |
| 2012/0185239 | A1 | 7/2012 | Goud et al. |

FOREIGN PATENT DOCUMENTS

| | | |
|---|---|---|
| WO | WO02/42864 | 5/2002 |
| WO | WO02/42940 | 5/2002 |
| WO | WO 2011/041443 | 4/2011 |
| WO | WO2012/173780 | 12/2012 |

OTHER PUBLICATIONS

Li, Yingbo, et al., "Multi-Video Summarization Based on OB-MMR," EURECOM, Sophia Antipolis, France, Content-Based Multimedia Indexing (CBMI) 2011 9th International Workshop; 6 pages http://www.eurecom.fr/fr/publication/3365/download/mm-publi-3365.pdf.

Masnick, Mike, "Creating an Automatic Highlight Reel for Sporting Events (Bleeding Edge)," Tech Dirt lite, Aug. 20, 2003, 2 pages http://www.techdirt.com/article_lite.php?sid=20030820/0042248& pid=17.

Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.

Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(S3)-Event-Based-Video-Surveillance.

Wang, Feng, et al., "Multi-Document Video Summarization," ICME 2009, IEEE International Conference on Multimedia and Expo, 4 pages http://www.eurecom.fr/fr/publication/2751/download/mm-publi-2751.pdf.

U.S. Appl. No. 12/471,404, filed Sep. 30, 2009, entitled "System and Method for Generating Personal Vocabulary from Network Data," Inventor(s): Satish K. Gannu, et al.

U.S. Appl. No. 12/571,414, filed Sep. 30, 2009, entitled "System and Method for Providing Speech Recognition Using Personal Vocabulary in a Network Environment," Inventor(s): Satish K. Gannu, et al.

U.S. Appl. No. 12/571,421, filed Sep. 30, 2009, entitled "System and Method for Ensuring Privacy While Tagging Information in a Network Environment," Inventor(s): Satish K. Gannu, et al.

U.S. Appl. No. 12/571,426, filed Sep. 30, 2009, entitled "System and Method for Controlling an Exchange of Information in a Network Environment," Inventor(s): Satish K. Gannu, et al.

U.S. Appl. No. 12/762,194, filed Apr. 16, 2010, entitled "System and Method for Deducing Presence Status from Network Data," Inventor(s): Thangavelu Arumugam, et al.

U.S. Appl. No. 12/778,899, filed May 12, 2010, entitled "System and Method for Deriving User Expertise Based on Data Propagating in a Network Environment," Inventor(s): Virgil N. Mihailovici, et al.

U.S. Appl. No. 12/971,852, filed Dec. 17, 2010, entitled "System and Method for Providing Argument Maps Based on Activity in a Network Environment," Inventor(s) Deepti Patil et al.

U.S. Appl. No. 12/971,946, filed Dec. 17, 2010, entitled "System and Method for Providing Feeds Based on Activity in a Network Environment," Inventor(s) Satish K. Gannu et al.

U.S. Appl. No. 13/088,974, filed Apr. 18, 2011, entitled "System and Method for Providing Augmented Data in a Network Environment," Inventor(s) Satish K. Gannu et al.

Hess, Andreas, et al., "Multi-Value Classification of Very Short Texts," 8 pages, printed on May 12, 2010 IDS; http://www.andreas-hess.info/publications/hess-ki08.pdf.

Horvitz, E., et al., "Coordinate: Probabilistic Forecasting of Presence and Availability," 2002, 10 pages; ftp://ftp.research.microsoft.com/pub/ejh/coordinate.pdf.

Kohl, J. and C. Neuman, The Kerberos Network Authentication Service (V5), Network Working Group, RFC 1510, 09.1993, 105 pages; http://www.ietf.org/rfc/rfc1510.

Lancope, "Stealth Watch," Revolutionize the Way You View Your Network, © 2009, 8 pages http://storage.pardot.com/2382/9637/StealthWatch_System_Family_Brochure.pdf.

Montgomery, W. A., et al., "Network Intelligence for Presence Enhanced Communication," SPIRITS Working Group, May 2002, 9 pages, http://ietfreport.isoc.org/all-ids/draft-montgomery-copeland-presence-spirits-00.txt.

Nortel Networks Wireless Solutions (A. Silver, J. Larkins, D. Stringer), "Unified Network Presence Management," A White Paper, © 2000, 6 pages, www.mobilein.com/UNPM.pdf.

Seher, Indra, "Query Expansion in Personal Queries," IADIAS (International Association for Development of the Information Society) 2006, 5 pages www.iadis.org/Multi2006/papers/16/5023_ISA.

Jiang, Weiliang, et al., "A Method for Personal Query Based on Role Preference Ontology," Industrial Mechanatronics and Automation, ICIMA 2009 International Conference, pp. 479-481; Abstract Only, 1 page.

U.S. Appl. No. 13/182,862, filed Jul. 14, 2011 entitled "System and Method for Deriving User Expertise Based on Data Propagating in a Network Environment," Inventor(s): Satish K. Gannu, et al.

Grimes, Seth, "Sentiment Analysis: Opportunities and Challenges," Beye Network; Jan. 22, 2008; 6 pages, http://www.b-eye-network.com/view/6744.

Moorthi, Y. L. R., "Have Breakfast or Be Breakfast," Wall Street Journal, Feb. 8, 2010, 2 pages; http://online.wsj.com/article/SB126465641868236415.html#printMode.

Nexidia, "Audio and Speech Analytics Software," 1 page; printed Sep. 30, 2009; http://www.nexidia.com.

NSA Watch. "Other Surveillance Network: Governmental Surveillance Agencies," 2 pages; printed Sep. 30, 2009; http://www.nsawatch.org/networks.html.

Ohl, Ricky, "Computer Supported Argument Visualisation: Modelling Wicked Problems," Ph.D. Thesis, Australian Digital Theses Program, Feb. 2008; 403 pgs.; http://gu.edu.au:8080/adt-root/public/adt-QGU20090724.155249/index.html.

Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w50405265r177/.

Roselle Data Mining & Database Analytics, "Web Search and Web Navigation Pattern Analyzer," 3 pages; printed Jul. 25, 2011; http://222.roselladb.com/surf-pattern-analyzer.htm.

Smith, Ronnie W., "Performance Measures for the Next Generation Language Dialog Systems," pp. 37-40; http://acl.ldc.upenn.edu/W/W97/W97-0607.pdf.

Swabey, Pete, "Making the Invisible Visible," 2 pages; Sep. 23, 2009; http://www.trampolinesystems.com/news/in+the+news/archive/2009/59.

Trampoline Systems, "Navigation," 2 pages; printed Sep. 30, 2009; www.trampolinesystems.com.

Trent, Jennifer, "Studying Social Tagging and Folksonomy: A Review and Framework ," Jan. 2009, 10(1) Journal of Digital Information; 42 pages http://dlist.sir.arizona.edu/arizona/handle/10150/105375.

Virage, "Audio Analysis," Autonomy Virage, © 2009 Autonomy Virage, 1 page http://www.virage.com/security-and-surveillance/functions/audio-analysis/index.htm.

Virage, "Understanding Video," Autonomy Virage, © 2009 Autonomy http://www.virage.com/rich-media/technology/understanding-video/index.htm.

Wasiiewska, Anita, 'CSE 634—Data Mining: Text Mining; 85 pages; www.cs.sunysb.edu/~presentations/TextMining.pdf.

WebChoir Products—Personal Vocabulary Tools, "Personal Tools," 1 page; printed Sep. 30, 2009 http://www.webchoir.com/products/ptt.html.

Wikipedia, "Homophone," 3 pages; printed Sep. 30, 2009; http://en.wikipedia.org/wiki/Homophone.

Wikipedia, "International Phonetic Alphabet," 19 pages; printed Sep. 30, 2009; http://en.wikipedia.org/wiki/International_Phonetic_Alphabet.

Wikipedia, "Phoneme," 7 pages; printed Sep. 30, 2009; http://en.wikipedia.org /wiki/Phoneme.

"Click Scoring Relevance Framework," LucidWorks, 7 pages [retrieved and printed May 7, 2012] http://lucidworks.lucidimagination.com/display/lweug/Click+Scoring+Relevance+Framework.

"Google Custom Search," Web Page, Google.com, © 2012 Google, 1 page http://www.google.com/cse/.

"Recommender System," Wikipedia, Apr. 28, 2012; 9 pages http://en.wikipedia.org/wiki/Recommender_system.

"Understanding Metadata," NISO Press, National Information Standards Organization, 2004, 20 pages.

Bollen, et al., "Usage Derived Recommendations for a Video Digital Library," Journal of Network and Computer Applications, Academic Press, New York, NY, vol. 30, No. 3, Mar. 16, 2007.

Dang, et al., "Learning to Rank Query Reformulations," Proceedings of the 33rd Annual International ACM SIGIR Conference, SIGIR' 10, Jul. 19-23, 2010, Geneva, Switzerland (2010); 2 pages.

EPO Nov. 7, 2012 Response to Communication pursuant to Rule 161(1) and 162 from European Application No. 10770664; 8 pages.

Filippova, et al., Improved Video Categorization from Text Metadata and User Comments, Proceedings of the 34th Annual International ACM SIGIR Conference, SIGIR' 11, Jul. 24-28, 2011, Beijing, China (2011); 8 pages.

Gligorov, User-generated Metadata in Audio-visual Collections, Proceedings of the International World Wide Web Conference, WWW 2012, Apr. 16-20, 2012, Lyon, France (2012); 5 pages.

Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.

Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.

PCT Oct. 4, 2012 Notification of Transmittal of the International Search Report and Written Opinion of the International Search Authority from Application PCT/US2012/040097; 15 pages.

PCT Apr. 3, 2012 International Preliminary Report on Patentability and Wrtten Opinion of the International Searching Authority from International Application PCT/US2010/050762; 7 pages.

Rodriguez, et al. Automatic Metadata Generation Using Associative Networks, ACM Transactions on Information Systems, vol. 27, No. 2, Article 7, Feb. 2009.

Telestream, Inc. Product Literature, "Extracting and Preparing Metadata to Make Video Files Searchable," Telestream, Inc. 2008; 6 pages.

Umbrich J., et al., "Four Heuristics to Guide Structured Content Crawling," Eighth International Conference on Web Engineering, 2008, Jul. 14, 2008; © 2008 IEEE DOI 10.1109/ICWE.2008.42.

U.S. Appl. No. 13/088,974, filed Apr. 18, 2011 entitled "System and Method for Providing Augmented Data in a Network Environment ", inventor(c): Satish K. Gannu et al.

U.S. Appl. No. 13/098,434, filed Apr. 30, 2011, entitled "System and Method for Media Intelligent Recording in a Network Environment ,", Inventor(s): Ashutosh A. Malegaonkar, et al.

PCT Notification of Transmittal (1 page) of the International Search Report (3 pages), and Written Opinion of the international Searching Authority, or the Declaration (6 pages) mailed Jan. 12, 2011 for PCT/US2010/050762.

Chen, Hsinchun, et al., "A Concept Space Approach to Addressing the Vocabulary Problem in Scientific information Retrieval: An Experiment on the Worm Community System," Journal of the American Society for information Science Wiley for Asis USA, vol. 48, No. 1, Jan. 1997, XP002614340, ISSN: 0002-8231; pp. 17-31.

Chen, Rung-Ching, et al., "Adding New Concepts on the Domain Ontology Based on Semantic Similarity," International Conference on Business and information, Jul. 12-14, 2006, XP002614339; 14 pages; http://bai2006.atisr.org.CD/Papers/2006/bai6169.pdf.

Sethy, Abhinav, et al., "Building Topic Specific Language Models from Webdata Using Competitive Models," 9th European Conference on Speech Communication and Technology, Eurospeech Interspeech 2005 International Speech and Communication Association Fr., 2005, pp. 1293-1296; XP 002614341; http://sail.usc.edu/publications/sethy-euro2005.pdf.

"The LNTS Leap: Phoneme Recognition," 2 pages; printed Sep. 30, 2009; http://www.Intstech.com.

U.S. Appl. No. 13/364,102, filed Feb. 1, 2012 entitled "System and Method for Creating Customized On-Demand Video Reports in a Network Environment," Inventor(s): Deepti Patil, et al.

Lacher, Martin S., et al., "On the Integration of Topic Maps and RDF Data," Extreme Markup Languages 2001, 14 pages.

Wang, Xuerui, et al., "Topics over Time: A NonMarkov Continuous Time Model of Topical Trends," KDD'06, Aug. 20-23, 2006, 10 pages.

U.S. Appl. No. 13/160,701 filed Jun. 15, 2011 entitled "System and Method for Discovering Videos," Inventors(s) Ashutosh A. Malegaonkar, et al.

U.S. Appl. No. 13/149,405, filed May 31, 2011 entitled "System and Method for Evaluating Results of a Search Query in a Network Environment," Inventor(s): Satish K. Gannu, et al.

Billi, R., et al., "Interactive Voice Technology at Work: The CSELT Experience," 2nd IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.

Carnegie Mellon University, "Speech at CMU," 4 pages; printed Sep. 30, 2009; http://www.speech.cs.cmu.edu/speech/.

Caslon Analytics Echelon Note: Overview, May 2006, 6 pages; printed Sep. 30, 2009 http://www.caslon.com.au/echelonnote.htm.

Hess, Andreas, et al., "From Web 2.10 to Semantic Web: A Semi-Automated Approach," 15 pages; printed Sep. 30, 2009; http://www.andreas-hess.info/publications/hess-cisweb08.pdf.

iLogos v1.5 download (win); 4 pages. [Retrieved and printed on May 28, 2010] from http://www.phil.cmu.edu/projects/argument_mapping/.

Jadhav, N.S. and and I.N. Dwivedi, "Social computing based personal vocabulary building," 5 pages; printed Sep. 30, 2009; http://www.priorartdatabase.com/IPCOM/000173550/.

Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury.enterprise/maybury.enterprise.pdf.

* cited by examiner

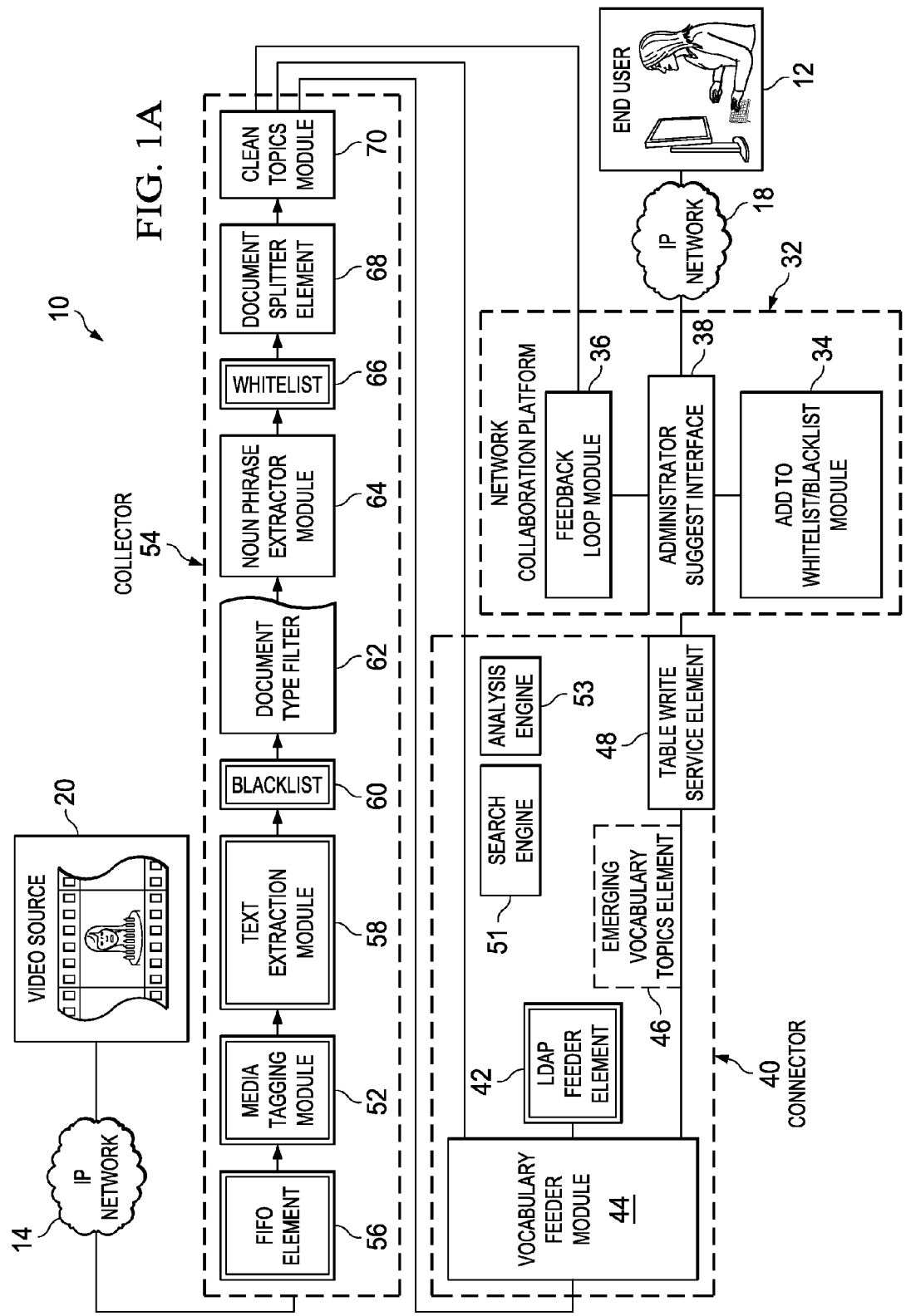

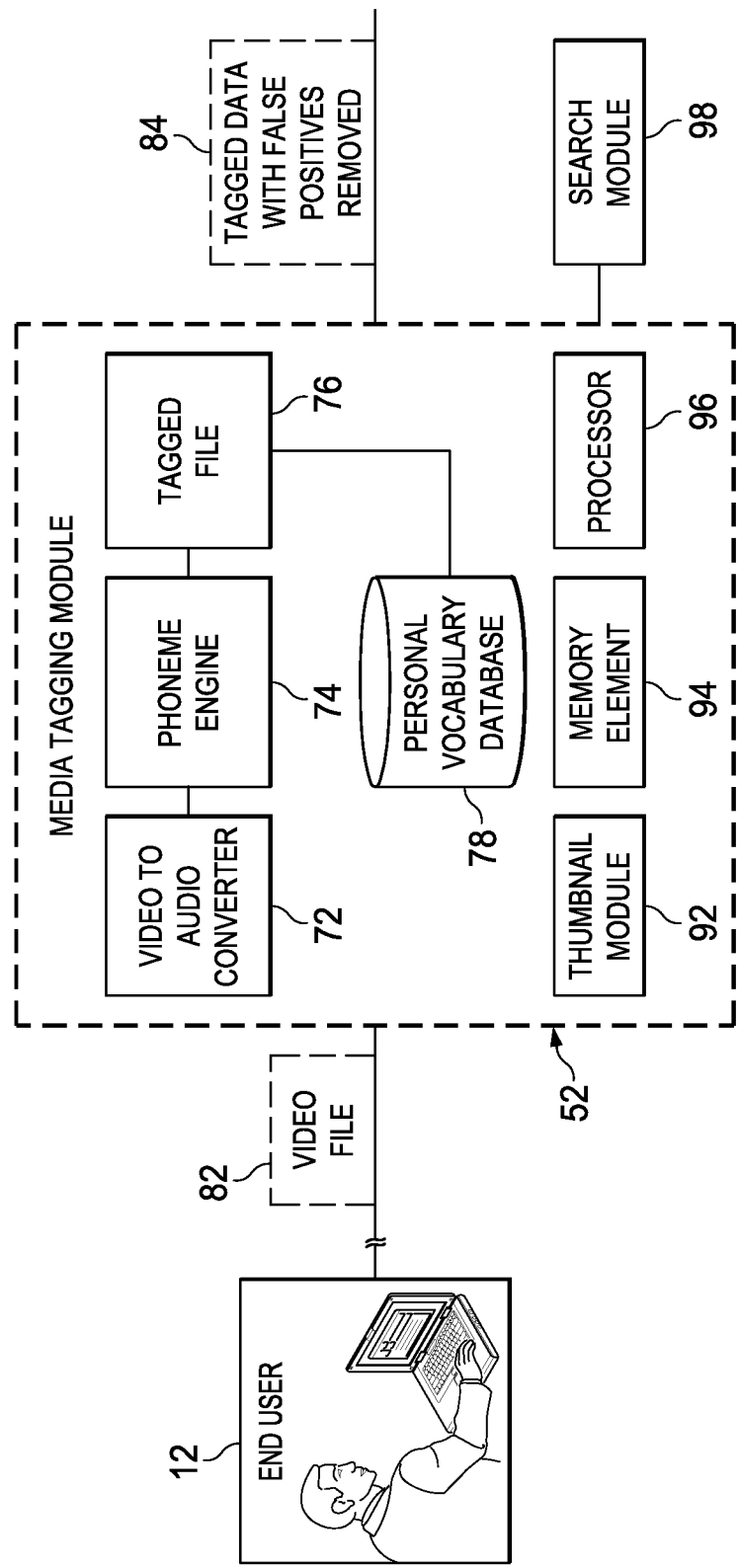

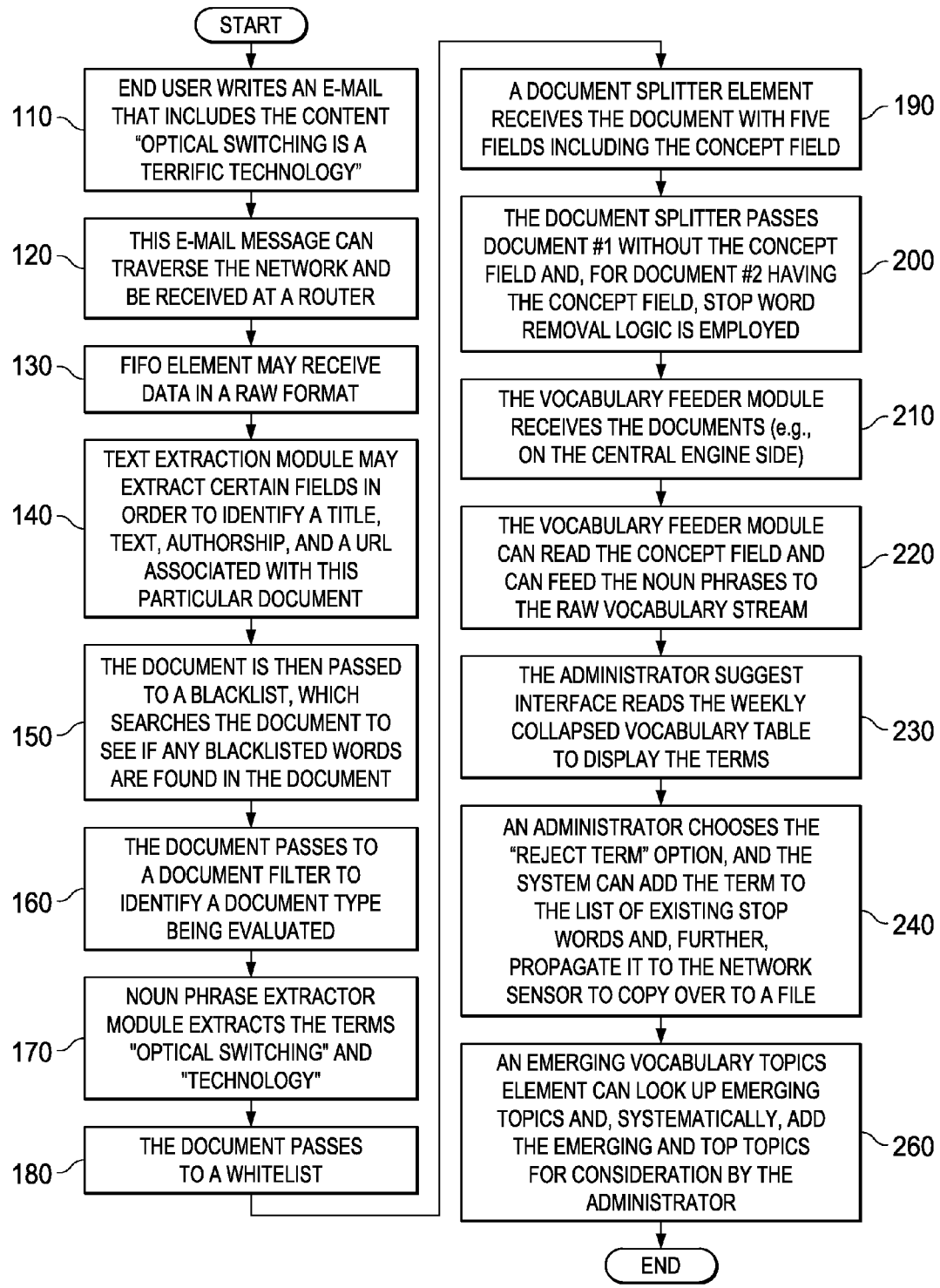

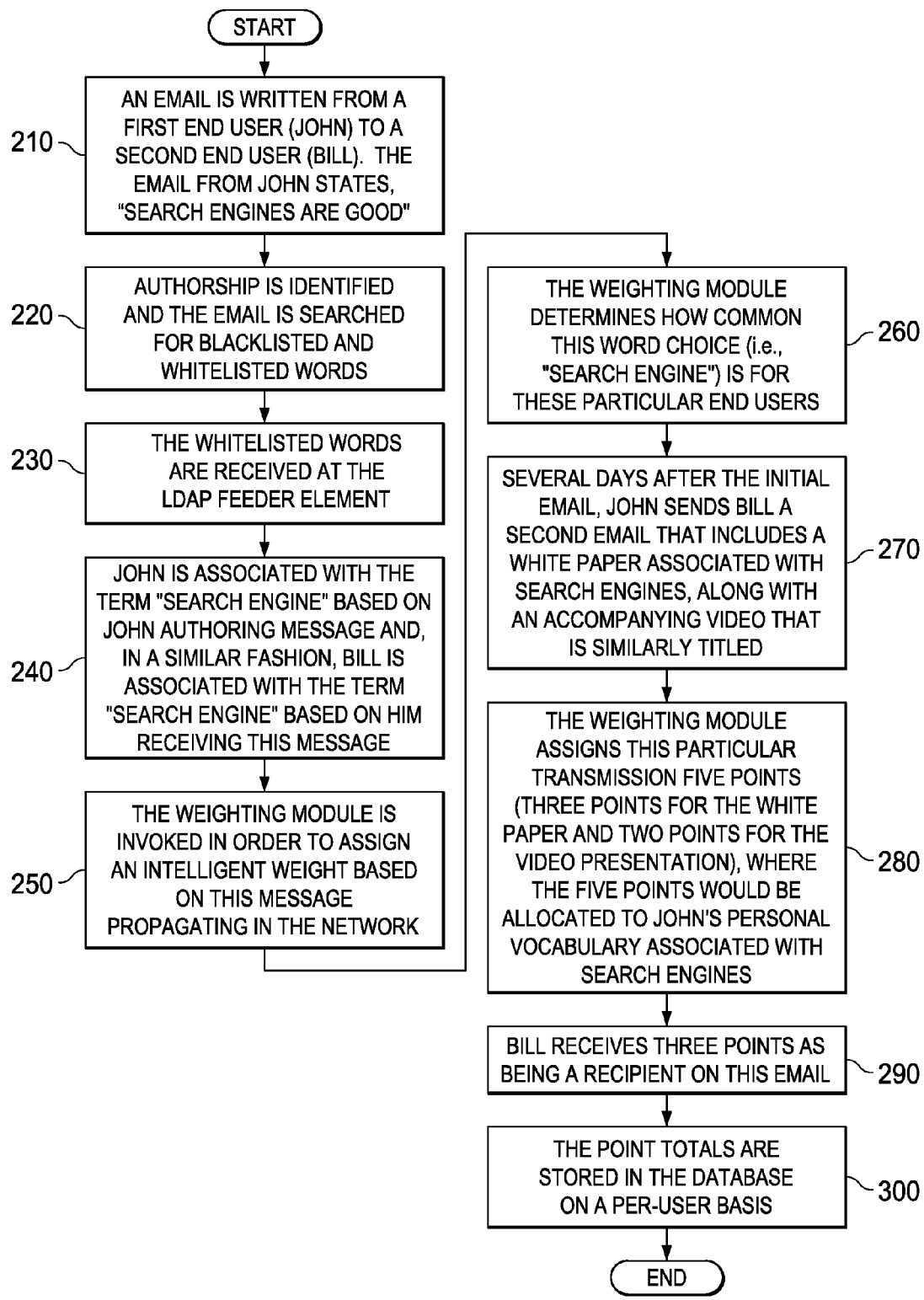

SYSTEM AND METHOD FOR EVALUATING VISUAL WORTHINESS OF VIDEO DATA IN A NETWORK ENVIRONMENT

TECHNICAL FIELD

This disclosure relates in general to the field of communications and, more particularly, to evaluating visual worthiness of video data in a network environment.

BACKGROUND

The field of communications has become increasingly important in today's society. In particular, the ability to effectively gather, associate, and organize information presents a significant obstacle for component manufacturers, system designers, and network operators. As new communication platforms and technologies become available, new protocols should be developed in order to optimize the use of these emerging protocols. Certain issues have arisen in enterprise scenarios in which users are systematically bombarded with videos. In many cases, these videos consume an inordinate amount of personal time, which could be devoted to other activities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified block diagram of a communication system for providing visual worthiness ratings in a network environment in accordance with one embodiment;

FIG. 1E is a simplified block diagram of a media tagging module in the communication system in accordance with one embodiment;

FIG. 3 is a simplified flowchart illustrating a series of example activities associated with the communication system; and FIG. 4 is a simplified flowchart illustrating another series of example activities associated with the communication system.

DETAILED DESCRIPTION OF EXAMPLE EMBODIMENTS

Overview

Figure 1B:
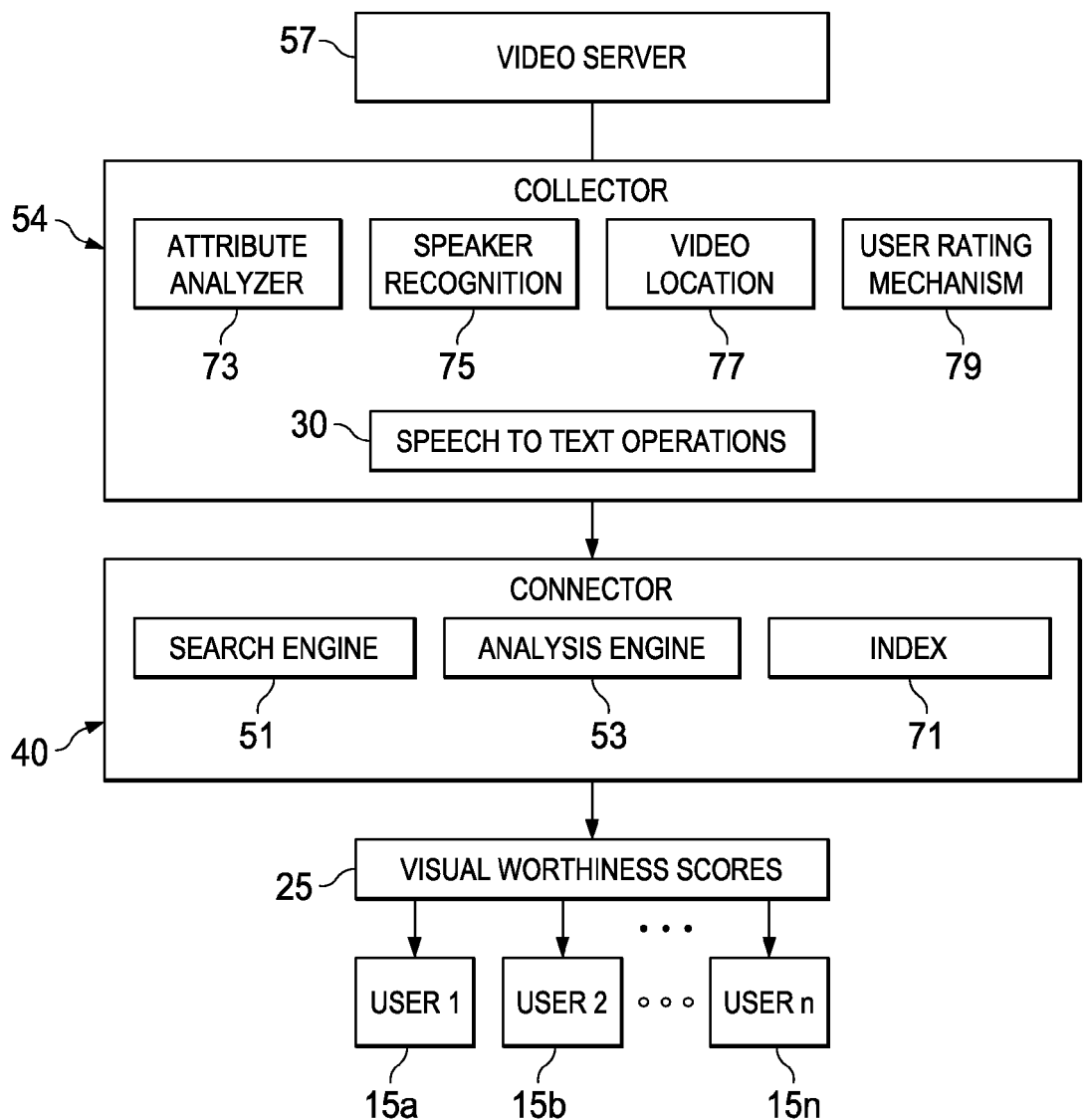
FIG. 1B is a simplified block diagram illustrating one possible implementation associated with providing visual worthiness ratings in accordance with one embodiment.

A method is provided in one example and includes evaluating a video file in a network environment; determining an identity of at least one speaker associated with the video file in order to generate an identity attribute; performing speech to text operations associated with the video file in order to generate at least one text attribute; generating a visual worthiness rating based, at least, on the identity attribute and the text attribute associated with the video file. The visual worthiness rating is reflective of a visual significance of image content in the video file (e.g., whether image content in the video file has a certain visual significance for understanding information in the video file, or significance for this particular user based on his profile, preferences, etc.). The method can also include rendering the visual worthiness rating to the end user prior to the video file being played.

In specific instances, additional attributes are generated and used in formulating the visual worthiness rating. The attribute can include: an author attribute reflective of authorship of the video file; a video playing source attribute; a number of views attribute associated with a number of times the video file has been viewed; an upload time attribute associated with when the video file was uploaded; a commentary attribute associated with comments in the video file; a location attribute associated with a location for the video file; or a scene change attribute associated with differences between video frames.

In other instances, the identity of the speaker is determined speech recognition; facial detection; picture matching; subtitle information in the video file; keyword recognition; or credit identification in the video file. Additionally, separate visual worthiness ratings can be developed for particular sections of the video file. In certain example implementations, preferences of the end user can be evaluated in order to generate an alert to be sent to the end user for a particular file that matches at least some of the preferences.

Other example embodiments can include sending an alert to the end user to provide a recommendation for adjusting screen space allocations for particular sections of the video file. Additionally, weights are assigned to particular attributes discovered in video data propagating in network traffic, the weights being used to generate additional visual worthiness ratings for additional video files. Also, timestamps of the video file can be captured in order to alert a particular user of specific sections of the video file having a particular visual worthiness rating.

In the context of searching activities, the method can include receiving a search query that includes a particular attribute sought to be identified within a plurality of video files; and retrieving at least some of the plurality of video files based on a presence of the particular attribute. Separately, relationships associated with the end user can be evaluated in order to recommend particular video files for viewing by the end user. Also, user engagement is tracked for a particular video file in order to provide a visual worthiness rating for the particular video file.

Example Embodiments

FIG. 1A is a simplified block diagram of a communication system 10 for providing visual worthiness ratings of video files for users operating in a network environment. FIG. 1A may include an end user 12, who is operating a computer device that is configured to interface with an Internet Protocol (IP) network 18. In addition, a video source 20 is provided, where video source 20 interfaces with the architecture through an IP network 14. Communication system 10 may further include a network collaboration platform (NCP) 32, which includes an add to whitelist/blacklist module 34, a feedback loop module 36, and an administrator suggest interface 38. FIG. 1A may also include a connector 40, which includes a lightweight directory access protocol (LDAP) feeder element 42, a vocabulary feeder module 44, an emerging vocabulary topics element 46, and a table write service element 48. Connector 40 may also include a search engine 51 and an analysis engine 53.

FIG. 1A may also include a collector 54 that includes a first in, first out (FIFO) element 56, a media tagging module 52, a text extraction module 58, a blacklist 60, a document type filter 62, a noun phrase extractor module 64, a whitelist 66, a document splitter element 68, and a clean topics module 70. Multiple collectors 54 may be provisioned at various places within the network, where such provisioning may be based on how much information is sought to be tagged, the capacity of various network elements, etc.

In accordance with certain embodiments, communication system 10 can be configured to recognize view-worthy sections within video segments (or the worthiness of an entire video presentation) based on various attributes (e.g., speaker identification, content-type attributes, etc.). This information can be leveraged in order to alert/suggest/inform the user of the worthwhile video sections that merit her attention. Such a filtering maximizes productivity at work, as individuals would selectively consume significant pieces of information via video. The visual worthiness rating reflects an evaluation of video characteristics and/or image data, as they lend to any type of understanding or comprehension of materials presented in a given video file. For example, some materials can be equally understood through simply listening to audio data of a video file (in contrast to listening to the audio data and watching the video simultaneously). Many examples are provided below to illustrate these scenarios in which it is equally sufficient to listen only to audio data of a video file. Hence, the terminology 'visual worthiness rating' is broad, and reflective of whether image content in (or video characteristics of) the video file may have a certain significance for understanding information in the video file.

As a corollary, one aspect of the present disclosure can relate to alerting a given end user of potential screen space allocations in order to recommend optimizing the screen to allow a user to be attentive for selected parts of a video file. The visual worthiness rating mechanism empowers the end user with information (beforehand) to make better time management decisions. Simultaneously, the visual worthiness rating mechanism directs the user's attention to significant videos, which may be deserving of consideration. Without such intelligence, the user would be relegated to trial and error activities in a haphazard attempt to watch video segments having significance.

Before turning to additional operational capabilities of communication system 10, certain foundational information is provided in order to elucidate some of the problematic areas associated with video watching activities. In many employment scenarios, employees are bombarded by videos during the workday. Many of the videos are of a sufficient quality to be a simple audio file: standing on its own. In those scenarios, the visual aspect of the file does not add significant value for the audience. Typically, when video is played on the desktop, other applications have to be minimized, or the desktop has to be shared.

Workplace distractions have grown increasingly problematic due to the ubiquitous nature of video communications. In many cases, business leaders are electing to send video segments in place of personal conversations with employees. For example, a video message (e.g., a video blog) can be sent by an executive to all his/her employees. As the message is received, the recipient would begin playing the video file, adjust earphones, maximize the video screen, adjust the audio, etc. Many such videos would be equally informative if employees simply heard the video's soundtrack versus watching the entire video file. Many architectures suggest or recommend videos based on user interests.

In contrast to these activities, communication system 10 is configured to alert the user ahead of time when a video, or when sections within a video, are worth watching (i.e., worth visually observing the information in comparison to simply hearing the associated audio data). Moreover, communication system 10 has the intelligence to rate/suggest videos that merit attention: especially in an enterprise environment where employees have limited screen space on their workstations (e.g., laptops). For example, a mundane video blog from an executive (not using visual materials in his presentation) would not deserve laptop screen time, as such a video file could readily be provided as only audio. If that video were to be received by an employee, and if that employee understood an inherent rating associated with the video, that video file could be minimized, while the audio is still being heard, without detracting from the value of the presentation. The architecture of the present disclosure can present (in advance) a score of video worthiness such that the user can make a quick informed decision about whether to actually view the video file (versus simply hearing it).

If a user can only listen to an audio channel (of a received video file), then the user can multitask and accomplish other (visually oriented) tasks in parallel. The architecture can assist users in identifying if a given media content file (or a portion of a program) is predominately auditory. Conversely, the architecture can inform the user that a given video has significant visual content, which requires full viewing attention.

Hence, a first aspect of the architecture can employ various techniques that match user expectations to incoming video files, which are provided with a visual worthiness rating. A second aspect of the architecture involves presenting the rating as an attribute (e.g., in the context of a video search result) in order to allow the users to make informed decisions about which video files should be watched, listened to, or considered at an alternative time frame (e.g., after the workday has completed, when an employee can more liberally use screen time). A third aspect of the architecture involves alerting users about an upcoming view-worthy section within a video, while the video is playing. This could allow the user to minimize the screen when viewing is not critical to understanding the presented material and, conversely, maximizing the video file when alerted about an upcoming (visually worthy) section. Note that any of the alerts discussed herein in this Specification can be provided to an end user in various formats. For example, the alert can be a pop up screen, an instant message, an e-mail, a text message, a graphic, a sound alarm, etc. or any other suitable element configured to alert an end user.

It should be understood that the platform is not bluntly recommending interesting sections within a video. For example, an interesting section within a video file may still be significant enough to hear versus watching the video file. Instead, the platform has the intelligence to identify parts of the video that merit one's visual attention. This would allow key content to reach the employee without disturbing work screen time. The employee can work and listen to sections within a video at the same time and, further, only maximize his screen when alerted to do so. Along similar lines, a user could make an intelligent decision about which videos should be viewed at home (away from the enterprise), when he has freer screen time (e.g., in this scenario where the user knows that a certain video has a 90% view-worthiness measure). In at least a general sense, knowing that a certain video demands 70-90% of a user's visual attention helps employees to plan when and where they can devote their visual attention.

Turning to FIG. 1B, this particular example includes multiple users 15a-n, along with collector 54 and connector 40 of FIG. 1A. This particular example reflects a rating mechanism associated with providing information to empower users to make intelligent decisions about which videos should be visually viewed. FIG. 1B includes a video server 57 being coupled to collector 54, which includes an attribute analyzer 73, a speaker recognition element 75, a speech to text operations element 30, a video location element 77, and a user rating mechanism 79. Also illustrated in FIG. 1B is connector 40, which can include search engine 51, analysis engine 53, and an index 71. This information can be evaluated to provide a set of visual worthiness scores 25. Note that the term 'rating' as used herein in this Specification is intended to include any type of scoring, evaluation, ranking, recommendation, designation, counting, tallying, or any other information that may be indicative of providing guidance to an end user about aspects of a video file (inclusive of the contents and/or individual segments within the video file).

In operation, the architecture of the present disclosure can collect video data (e.g., via collector 54) that may be originating from network traffic, from video server 57, from a video repository, or from any other suitable location. The videos can be captured in real-time, or suitably uploaded by any appropriate entity (e.g., by employees, administrators, outside personnel, etc.) in order to create a video library in an enterprise environment.

Video data can be systematically evaluated and tagged in order to characterize the video data based on its attributes. Further, this information can be fed into a framework (e.g., an algorithm within connector 40) to provide guidance (i.e., a rating) about the visual worthiness of the associated video. Hence, the video data is being evaluated for visual worthiness characteristics, which can be used as a basis for generating a rating for an end user to consider.

For example, attribute analyzer 73 (e.g., provisioned in collector 54) can evaluate incoming packets, and then forward those packets onto other modules that further characterize the video data (e.g., identify the speaker at speaker recognition 75, identify the location of the video at video location 77, perform speech to text operations, identify the scene changes in the video, identify when was the video uploaded, etc.). In one example implementation, these modules can perform parallel processing that can be aggregated into (a common) index 71, which can be fed to search engine 51. Search engine 51 can be used to return appropriate results for end users querying the architecture for visual worthiness ratings about particular video files. Hence, after the information is extracted from the video, analysis engine 53 can be used in order to determine the visual worth of the video (e.g., where such operations may be performed at connector 40). Index 71 can contain data about each segment of each video in the system, information about the company, industry and people supplied by the administrator, as well as the preferences, vocabularies, and histories of each user using the system.

Logistically, multiple attributes can contribute toward the formula of recognizing 'watchable' or 'view-worthy' frames of the video file. By employing speaker recognition techniques, the platform can not only identify the speakers within a video, but the timestamps as they start and stop speaking. Once this information is collected, the platform can identify the percentage of speaking time for each speaker. Based on the information above, basic video classification can be achieved (e.g., video #1 was identified as including two speakers, where the first speaker's speech was tracked at 65%, while the second speaker's speech was tracked at 25%, and the remainder represented silence, or no speech). Additionally, such data can prove helpful in making stronger baseline assumptions (e.g., such as this video being associated with an interview). In another example, video #2 could be identified as only comprising a single speaker in which that speaker's speech time was tracked at 95%. Such a video file can be associated with a directive from one individual (e.g., an executive) to a group of audience members. Such inferences allow the platform to better classify videos as being worthy of being viewed.

Note that additional attributes such as whether the speaker is a celebrity, an industry veteran, a new executive addition to a company, etc. enables the platform to collect additional information (e.g., points) toward considering whether videos are worth viewing. Moreover, such personality types can be personalized for each user based on his/her 'speaker interests' (where this personalization can be identified via a combination of network tagging data of user activity, and by enabling a "follow person A" capability within the platform). Further, recognizing whether a video is a demonstration (demo), training materials, or a tutorial helps to alert the user when/how to view the video file. The architecture can also track when these items begin and end within the video file such that, again, the user is permitted to maximize his efficiency in watching these items.

Note that identifying video characteristics can be performed in a number of ways, where one method can entail tracking words such as "Let us see how this is done," or "As you can see," or "On my left," "On my right", etc. In other instances, as the scene changes, this can be detected by the architecture. For example, if there is a drastic change between two video frames and, further, this delta is consistent for multiple frames, the architecture understands that this portion of the video may be of interest to watch. Adding to this material could include identifying PowerPoint build-ups, which may be part of most view-worthy videos. Another protocol to characterize videos can involve identifying backgrounds and background noise. If the architecture detects significant background noise, this could draw the inference that this video was recorded outdoors (i.e., in comparison to indoors in a conference room), where this may be of interest to the employee as something worth viewing.

Hence, one feature of communication system 10 addresses identifying these factors within a video file and, subsequently, informing the user (before the videos are watched) of the appropriate rating. Another feature includes alerting the user of the visual worthiness rating in order to empower the user to make a calculated decision about which videos should be watched, listened to without visual monitoring, or when such video files should be viewed (e.g., during business hours, during personal hours, etc.). These features are amenable to accommodating end user preferences such that significant information is consumed by employees (as intended) without disturbing the current flow of work.

Figure 1C:
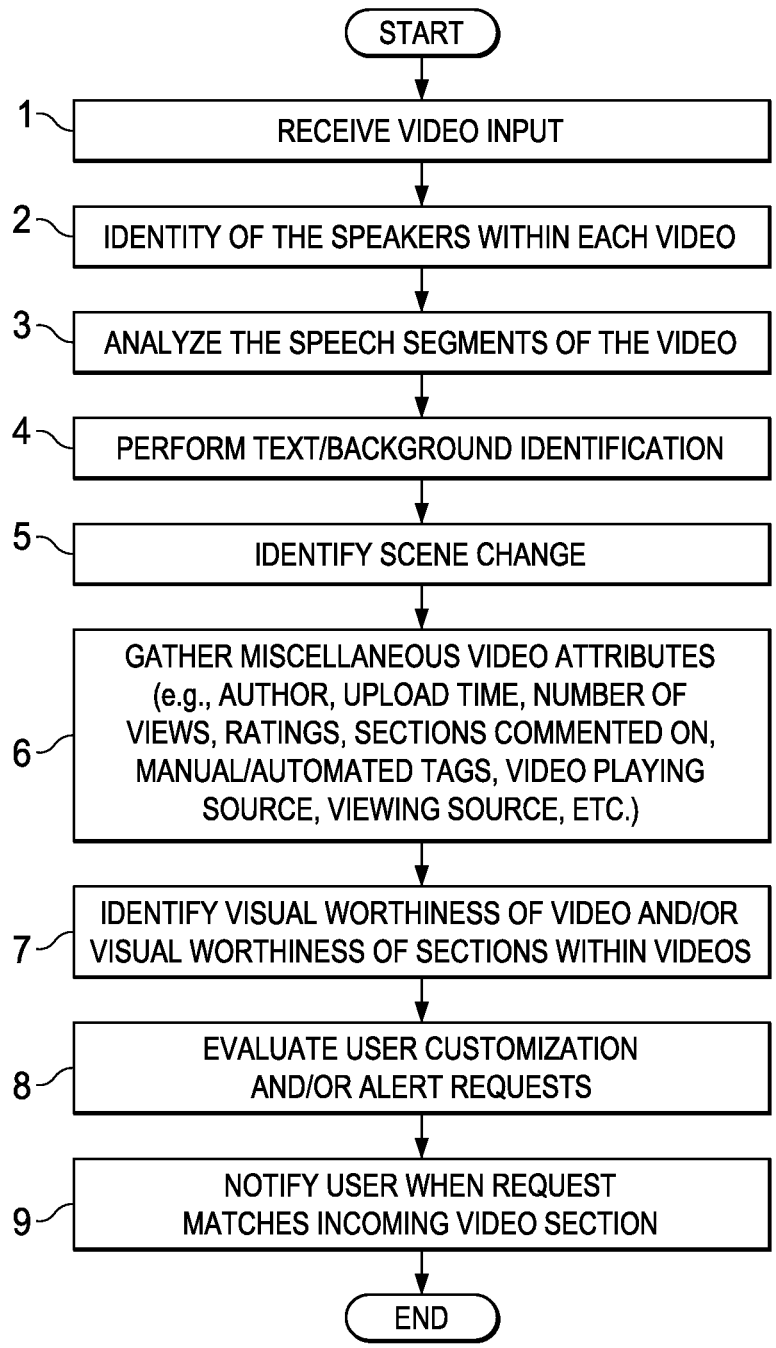
FIG. 1C is a simplified flowchart associated with one embodiment of the present disclosure.

Turning to FIG. 1C, FIG. 1C is a simplified flowchart illustrating example activities associated with one feature of the present disclosure. This particular flow may begin at step one, where video input is received. At step two, the identity of the speakers within each video is obtained. This can include speech recognition activities, key word recognition, picture matching, subtitle/credits identification, etc. At step three, the speech segments of the video can be analyzed for noise recognition, speech to text information, volume peaks, etc. At step four, text and background identification can be performed. At step five, changes in scenes can be detected. At step six, miscellaneous video attributes and metadata can be gathered (e.g., author, upload time, number of views, ratings, sections commented on, manual/automated tags, video playing source, viewing source, etc.). At step seven, the visual worthiness of video (and/or visual worthiness of sections within videos) is identified. At step eight, user customization and/or alert requests are evaluated. At step nine, the user is notified when a request matches an incoming video file/video section.

Note that in particular scenarios involving the enterprise environment, consider the following types of video data that commonly propagate in the network: 1) executive communications; 2) training data; 3) demonstrations; 4) interviews; 5) video blogs; 6) announcements; 7) product launch data; and 8) meeting/conference data. It can be appreciated that many of these materials (in regards to maximizing workplace efficiency) could have equally been listened to without watching the actual video.

One aspect of the present disclosure involves identifying how much of a video is worth watching and, further, pointing to the exact sections within a video to be watched in order to save employee screen time. Such discernment would make efficient use of the incoming video files without compromising work tasks. Any number of variables could be considered in selecting whether to watch (or only listen) to a video file (e.g., if the speaker is the user himself/herself; if the speaker is someone known to the user; if the speaker is a celebrity, guru, star, etc.; if the user has contributed to that video in any way; if the video represents a demonstration, training, writing on a whiteboard, a product display, etc.; if the video has no speech throughout; if the video is shot in an unusual location; if other end users have tagged the video in certain manners; system recommendations, etc.). Hence, certain embodiments of the present disclosure involve evaluating a relationship between an end user about to watch a video file, and a participant(s) of the video file.

In operation, the architecture of communication system 10 is configured to identify various attributes of the video, which when suitably aggregated, provide a visual worthiness rating of the image data of the video. In one particular scenario, the following attributes are used in identifying the viewing worthiness of the video: 1) identity of the speakers within each video; 2) identification of the accompanying speech; 3) text identification; 4) video location; 5) authorship; 6) mechanism for users to rate; and 7) visual attention gripper.

After completing facial recognition and/or speaker identification activities, the architecture can readily identify timestamps associated with when the speakers start and stop speaking. The architecture could then suggest worthwhile sections of the video file to be viewed by an end user based on making intelligent connections about whether the speaker is the user himself or someone of significance to the user. Moreover, identifying whether the viewer knows a speaker (or is interested in the speaker) can be based on the enterprise directory information, email contact groups, social networking based relationship maps, people belonging to the same functional program, workplace relationships, etc. For example, users may wish to see sections of the video having people from their immediate team (directory reporting structure), everyday coworkers (directory+email contact list), someone they work with closely (email contacts+email tagging+network based relationship maps), from their external groups (mailing lists), etc. Another protocol for accomplishing this objective can involve offering an explicit option for users to decide whom they would like to view as part of their preferences. Hence, the architecture is configured to match the identified speakers of the video to the viewer's database of preferred people and, further, alert the user about video file sections that display a match.

Note that for identifying celebrities, industry-based icons may necessitate the architecture to utilize a combination of speaker recognition, face recognition, speech identification and/or text identification. In certain scenarios, in order to identify an industry-based icon, the architecture can have knowledge of the industry in which it is being deployed. For example, if the architecture were deployed in an oil industry, it would maintain a reference database of the veterans of the oil industry in order to perform lookups, when appropriate. This could involve a list of names and/or pictures to aid the system in such identification activities.

In the case of speech recognition, phrases such as "Let me introduce Ms. XYZ," "Let's welcome ABC," "We have among us DEF", etc. can be extracted to match these names to the list of the viewer's preferred people. If no match were identified, then an incoming request can be matched to the general industry icon list to see if there is any worthy match to suggest to the user. Additionally, text identification can extract names from banners welcoming celebrities, or information can be gleaned from placards that identify panelists, from video credits, from sub-titles within a video, from closed-caption streams, etc. Any such places within a video can reveal the identity of speakers, which can be matched to a predefined celebrity list to enable recipients of video files to make intelligent decisions about which files should be watched.

Furthermore, another way to identify the degree of celebrity of a given person in a video can involve performing a web search on the name and, if a significant number of hits results, this would be indicative of celebrity status. As discussed below, communication system 10 has a mechanism to tag authors of media (e.g., email, documents, videos, etc.). This information can allow the architecture to understand if the viewer of a given video is the author himself and, subsequently, decide whether this video is worthy of being viewed.

In particular implementations, to identify if the video is a demonstration video, the architecture can extract keywords/phrases (e.g., "demonstration", "demo", "trial", "show you how", "let's see how this is done", "as you can see", "to/on my right/left", "above/below me", "at the bottom/top/bottom left/bottom right/top left/top right", "the following slides", etc.). Additionally, detecting gestures, the use of props, and movements of people (that are not usually associated with being a talking head type content) may also be valuable indicators.

The architecture can also intelligently identify objects, backgrounds, and/or background noise. Videos that may demand the user's visual attention can be associated with video files having no audio, no speech, or speech in the form of a song. Such videos commonly have a slideshow in a video format, where the user may have no other choice than to halt his/her current work to watch the video. For scene detection activities, if there is a significant change between two video frames and, further, if this delta is consistent for multiple frames, such information can point toward a change in background or a visual change that signifies a video file needing visual attention (or it could be indicative of a PowerPoint).

In certain aspects of the present disclosure, communication system 10 permits end users to rate one or sections of a video file (e.g., as "must watch," "not worth watching", or any other labeling that would be indicative of the value of watching a particular video (or its internal segments)). Moreover, collecting these visual worthiness ratings across various users (e.g., over a period of time) can be used by analysis engine 53 to recommend which videos (or sections of videos) should be viewed. In other implementations, such indicators could be as simple as a "thumbs up/thumbs down" soft button (or a slider, or other interactive control), where the user is invited to make a selection depending on their level of engagement.

Other features associated with communications system 10 involve intelligently tracking various forms of user engagement, while watching a specific video file. For example, automatic data gathering for particular sections of the video can occur such that the architecture evaluates when individuals are breaking from their multitasking routines to refocus their attentions on watching a video file. For example, the architecture can track: sections skipped (start time and end time); sections rewound, replayed; sections fast forwarded; speed of fast forward; playback window activity (resize, bring to front or back, etc.); activity in other windows (typing, mouse clicks, etc.); playback volume up or down; action committed after video viewing is finished (e.g., if a webpage where opened, if an e-mail was sent, if a bookmark where created, etc.) etc. This data about the engagement and behavior of previous viewers of a video can be powerful indicators of which segments future users may consider highly visually worthy.

Yet another aspect of the present disclosure involves alerting a user, who may be multitasking, if an upcoming segment of video playing in a (possibly hidden) playback window has a high visual worthiness rating. The goal of such alerts would be to unobtrusively attract the user's attention and, further, insure that the user is aware that something visually interesting is about to happen in the currently playing media stream. Several different alert mechanisms could be used to accomplish this objective, including: 1) automatically bringing the video playback window to the front just before the visual worthiness score exceeds a predefined threshold; 2) playing an audio cue; 3) changing the appearance of the playback window's minimized icon, window frame, or skin, etc. For example, as the visual worthiness score increases, the window frame could transcend from cool to warm colors, or blink, shimmer, etc.

Consider a flow involving certain weights that are assigned to attributes of a given video file. The following attributes can be used in order to offer a viable rating for a targeted video file.

a. Does user know one or more speaker? (Weight=3)
      Yes=1, No=0
   b. Is one or more speaker unknown to user, but popular? (Weight=2)
      Yes=1, no=0
   c. Is this video representative of an absolute visual object? (Weight=3)
      Yes=1, no=0
   d. Is the video a demo. (Weight=3)
      Yes=1, no=0
   e. Is the video shot in an unusual setting? (Weight=1)
      Yes=1, no=0
   f. Is the user the actual author of this video? (Weight=1)
      Yes=1, no=0
   g. Has more than one user rated this video as a must watch? (Weight=2)
      Yes=1, no=0

This information can be used to generate a rating (i.e., fed into any suitable algorithm within connector 40) representative of: $3a+2b+3c+3d+1e+1f+1g$. This simplistic example offers a formula to calculate the overall viewing worthiness of a video file. Moreover, to identify the viewing worthiness of sections of the video file, the following parameters can be evaluated.

Video #1
   Duration: 30 min
   Speaker #1 Time=1:00-12:00
   Speaker #2 Time=20:00-29:00
   Demo related keyword occurrences time=5:00, 8:00, 22:00, 24:00
   User rated sections time=5:00-10:00 and 20:00-25:00

In one particular implementation of the algorithm, view-worthy sections can be the intersection of the above timings with additional weights, which may be given for speakers known to the viewer of a particular video file. For example, speaker #1 could be the user's contact. Hence, although the intersection section may suggest one interval (e.g., 5-10 min and 22-25 min), since speaker #1 is the known contact, the most view-worthy section of this video file could be from 5:00 min to 10:00 min.

Turning to other inherent operational capabilities of communication system 10, personal vocabularies can be built for each user by gleaning the user's network traffic and by filtering keyword clusters. Analysis engine 53 can be configured to determine areas of interest for each user, as well as associations with other users. Appropriate filtering can occur by using the vocabulary and suitable weighting for each attribute.

In operation, communication system 10 has an inherent taxonomy, which lists business related terms, technologies, protocols, companies, hardware, software, industry specific terminology, etc. This set of terms and synonyms can be used as a reference to tag data seen by the system. The user's network traffic (e.g., email, web traffic, etc.) can be tagged based on enterprise vocabulary. Hence, collector 54 is provisioned to scan traffic (e.g., email, HTTP, etc.) received from subscribed users. While scanning the traffic, the system captures the relevant business terms (based on the constructed enterprise vocabulary), and associates the extracted terms to respective users.

The topics of interest for each individual user can be determined by any suitable mechanism. For example, this can be determined by building personal vocabularies for each user. In general, the platform is constantly extracting keywords based on the traffic the user is sending on the network, and associating these keywords to the corresponding user. Over a period of time, the platform develops a clear pattern of the most commonly used terms for this user. The system maps out the user's top terms/phrases, which become part of the user's personal vocabulary. For example, based on the user domain and the topics associated with outbound emails, or accessing documents over the web, each user forms a personalized vocabulary that reflects the areas he/she is most likely to discuss over the enterprise network.

Subsequently, the user's expertise is calculated per term. The user's personal vocabulary can be based on the number of occurrences a specific term as seen in the network (e.g., over a period of time). It can be independent of the other users in the system and, further, can be reflective of the user's individual activity on those terms. The expertise metric may be more complex, and may be provided relative to the activity of the other users in the system, along with the recentness of the activity and the relevance to a specific term. While calculating the expertise for a specific user for a specific business-related term, the system develops a list of relevant documents for that term, lists the authors of those documents, and ranks them based on relevancy scores. Any individual whose score is above a system-defined threshold, could join an expert set. Note that even though a user may be designated as being in the expert set, users of the expert set could still vary in their expertise level based on their scores.

In regard to accounting for user added tags (provided to their profiles), the platform offers automated tagging, personal vocabulary, and expertise derivation. It also allows users to manually add tags to their profile, as a way to account for any terms that the system may have inadvertently missed. In one particular example, the tags are restricted to the system's inherent master vocabulary. Based on the information the platform receives from the categories described above, the user's topics of interest can be derived, where weights can be provided to each of the personal vocabulary, the expertise, and the profile tags. The weights can offer flexibility to tweak the importance of a certain attribute based on the environment.

Note that for performing exact matches between users' personal vocabularies, once the platform derives an individual user's personal vocabulary, it can use this information to find others in the system sharing similar personal vocabularies. For example, if John's personal vocabulary includes terms such as video, media processing, audio, and encoding, while Tim's personal vocabulary includes video, media processing, and audio, then John and Tim would share a match in their respective personal vocabularies. This information is useful because it identifies employees in the company who seem to be involved in similar areas.

In the case of sub-string matches between users' personal vocabularies, consider the same example involving John. While Kate's personal vocabulary includes terms such as video encoding, media engine, and audio files, the system can identify that John and Kate may not have an exact vocabulary match, but that they share a high number of sub-string matches (e.g., video—video encoding, encoding—video encoding, media processing—media engine).

For processing the categorical matches, if John consistently uses Facebook (where Facebook falls under the category equal to social networking in his personal vocabulary), while Smith uses Twitter (where Twitter also falls under the category equal to social networking in his personal vocabulary), then John and Smith have a categorical match.

For processing inter-categorical matches, where John is tagged for Facebook (category=social networking, related terms=communities, status updates) and Linda has been tagged for Integrated Workforce Experience (IWE) (category=product, related terms=communities, status updates) then John and Linda have an inter-categorical match for communities and status updates. This would effectively link Facebook activity to IWE activity in a meaningful way, and across users. In regards to deriving each user's network based relations, the platform is configured to tag email and web traffic. Based on the email interactions a user has with other users on the system, the platform can generate a per-user relationship map. This allows the system to identify individuals with whom a person already communicates. Furthermore, this would allow for the identification of new individuals with whom there is no current relationship.

Using the inputs from above, each user's 'people of interest' can be derived by a function that incorporates the people from exact personal vocabulary matches, substring personal vocabulary matches, categorical matches, inter-categorical matches, and/or a user's network relationship. In terms of a logistical use case, consider an example where a given employee (John) has been actively working on a media-tagging product, which is an enterprise social networking and collaboration platform. Based on his activity from emails, web traffic, etc., the system derives his personal vocabulary, expertise, network relationships, etc. Additionally, the system determines John has a strong interest in video as a media form, and Facebook as an application.

Tim, Kate, Smith, and Linda have been identified as the people of interest to John based on the operational functions discussed above. Tim's connection was a result of exact personal vocabulary matches, Kate's connection was a result of sub-string matches, Smith's connection was a result of a categorical match, and Linda's connection (the farthest) was a result of an inter-categorical match. Based on the network relationships, the architecture can identify that John has an existing relationship with Tim (e.g., not only because of the email exchange, but because they also belong to the same group and because they report to the same manager). John and Kate do not belong to the same group, but have a strong email relationship with each other. Smith works in a social media marketing business unit, while Linda works in a voice technology group, as part of the IWE group: neither have ever communicated with John over email. Smith publishes a blog on an Intranet about harnessing social networking applications for the enterprise. Concurrently, John shares a presentation with a sales team associated with media tagging. Linda downloads papers associated with the concept of communities and status update virality to enhance the IWE product offering.

Turning to the infrastructure of FIG. 1A, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Note that the elements of FIG. 1A-1B can readily be part of a server in certain embodiments of this architecture. In one example implementation, collector 54, connector 40, and/or NCP 32 are (or are part of) network elements that facilitate or otherwise helps coordinate the visual worthiness rating operations, as explained herein. As used herein in this Specification, the term 'network element' is meant to encompass network appliances, servers, routers, switches, gateways, bridges, loadbalancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. Note that each of collector 54, connector 40, and/or NCP 32 can be provisioned with their own dedicated processors and memory elements (not shown), or alternatively the processors and memory elements may be shared by collector 54, connector 40, and NCP 32.

In one example implementation, connector 40 and/or collector 54 includes software (e.g., as part of search engine 51, analysis engine 53, attribute analyzer 73, etc.) to achieve the visual worthiness rating operations, as outlined herein in this document. In other embodiments, this feature may be provided externally to any of the aforementioned elements, or included in some other network device to achieve this intended functionality. Alternatively, several elements may include software (or reciprocating software) that can coordinate in order to achieve the operations, as outlined herein. In still other embodiments, any of the devices of FIG. 1A may include any suitable algorithms, hardware, software, components, modules, interfaces, or objects that facilitate visual worthiness rating operations. Additional operational capabilities of communication system 10 are detailed below.

Turning to the formulation of the personal vocabulary, it should be noted that in generating a large corpus of vocabulary words, one issue arises due to false positives. For example, the words "meet" and "meat" shared the same phonetics. If an architecture fails to account for these significant phonetics, then data collection, processing, and searching can ultimately be inaccurate. For example, when a new search is performed on each of these terms identified above, both terms could yield a large number of results. However, if the person who issued the query is interested in finding information (or people) related to some type of 'meet'ing protocol (e.g., in the context of WebEx technology), then those search results are targeting a specific usage of the term "meet." Results that are returned and that include the term "meat" are irrelevant for this particular search. Additionally, the person who received the inaccurate results is forced to sort through these irrelevant terms.

Communication system 10 can offer an intelligent filtering of words by leveraging the personal vocabulary of the individual who is associated with the collected data. The personal vocabulary can be developed in a different workflow, where the elimination of false positives represents an application of that personal vocabulary against an incoming media file. For example, as the system processes new end user media files (e.g., video, audio, any combination of audio/video, etc.), an additional layer of filtering can be performed that checks the collected (or tagged) terms against personal vocabulary. Thus, if a particular end user has a personal vocabulary that includes the term "meet", then as media files are identifying phonetically accurate words (e.g., "meet", "meat") in the audio track, the extraneous term (i.e., "meat") would be eliminated as being a false positive. Note that the probability of a personal vocabulary having two words that phonetically sound the same is low. This factor can be used in order to remove a number of false positives from information that is collected and sought to be tagged. This engenders a higher quality of phoneme-based speech recognition. Hence, the personal vocabulary can be used to increase the accuracy of terms tagged in media file scenarios.

In one general sense, an application can be written on top of the formation of an intelligent personal vocabulary database. A partitioned personal vocabulary database can be leveraged in order to further enhance accuracy associated with incoming media files (subject to tagging) to remove false positives that occur in the incoming data. Thus, the media tagging activity is making use of the personal vocabulary (which is systematically developed), to refine phoneme tagging.

The personal vocabulary developed by communication system 10 can be used to augment the tagging results associated with video or audio files. Phoneme technology breaks down speech (for example, from analog to digital, voice segmenting, etc.) in order to provide text, which is based on the media file. For example, as a video file enters into the system, the objective is to capture relevant enterprise terms to be stored in some appropriate location. The repository that stores this resultant data can be searched for terms based on a search query. Phonetic based audio technology offers a mechanism that is amenable to audio mining activities. A phonetic-index can be created for every audio file that is to be mined. Searches can readily be performed on these phonetic indices, where the search terms could be free form.

In one example, an end user can upload a video file onto the system. Enterprise vocabulary can be tagged for this particular video file (e.g., using various audio-to-text operations). The resulting enterprise vocabulary can be confirmed based on that particular end user's personal vocabulary, which has already been amassed. For example, if an original tagging operation generated 100 tags for the uploaded video file, by applying the personal vocabulary check, the resulting tags may be reduced to 60 tags. These resulting 60 tags are more accurate, more significant, and reflect the removal of false positives from the collection of words. Additional details related to media tagging module 52 are provided below with reference to the FIGURES. Before turning to those details, some primary information is offered related to how the underlying personal vocabulary is constructed and developed.

Communication system 10 can intelligently harvest network data from a variety of end users, and automatically create personal vocabulary from business vocabulary by observing each user's interaction/traffic on the network. In a general sense, the architecture can isolate terms per person in order to define an end user's personal vocabulary. This information can subsequently be used to identify specific experts. In other instances, the personal vocabulary can be used for topic-based social graph building (e.g., social networking applications). In other instances, this information can be used to improve the accuracy of speech-to-text translations, which can relate to the individual applications being used by the person, a particular environment in which the end user participates, feature invocation applications, etc. The solution can intelligently and dynamically auto generate different lists of personal vocabulary per user without creating additional overhead for the end users.

As part of its personal vocabulary development activities, communication system 10 can tag words for specific end users. For example, relevant words identified in an enterprise system can be extracted from the documents, which are flowing through the network. The tags can be categorized and then associated to the user, who generated or who consumed each document. In accordance with one example implementation, a tag can be given different weights depending on several potential document characteristics. One characteristic relates to the type of document propagating in the network (for example, email, an HTTP transaction, a PDF, a Word document, a text message, an instant message, etc.). Another characteristic relates to the type of usage being exhibited by the end user. For example, the system can evaluate if the end user represents the producer of the content (e.g., the sender, the poster, etc.), or the consumer of the content (e.g., the recipient, the audience member, etc.). In one example, if the end user were posting a document including the identified vocabulary, the act of posting such words would accord the words a higher weight, than merely receiving an email that includes the particular vocabulary words. Stated in different terms, in a forum in which the end user is authoring a document to be posted (e.g., on a blog, on a corporate website, in a corporate engineering forum, etc.), vocabulary words within that document would have a higher associative value than if the words were propagating in lesser forums (e.g., a passive recipient in an email forum). Yet another characteristic relates to a probability of a term showing up in a document. (Note that multiple word terms have a lower probability of occurrence and, therefore, carry a higher weight when they are identified). In one instance, the tagged vocabulary words can be aggregated using streaming databases, where the aggregated tags can be stored and archived in a summarized format.

The resulting information may be suitably categorized in any appropriate format. For example, a dynamic database (e.g., table, list, etc.) can be generated for each individual user, each user-to-user communication (e.g., 1-1, N or N, etc.), and each type of document (e.g., email, phone conversation messages, Meeting Place meeting data, WebEx data, blog posting, White Paper, PDF, Word document, video file, audio file, text message, etc.). Essentially, any type of information propagating in the network can be suitably categorized in the corresponding database of the tendered architecture. Some of the possible database configurations are described below with reference to the FIGURES.

It should be noted that there are several different types of objects flowing through the architecture of communication system 10. Components within communication system 10 can identify which objects should be processed by particular components of the configuration. One set of objects relates to media files. These can be received by FIFO element 56 and subsequently passed to media tagging module 52. The resultants (from processing, which occurs at media tagging module 52) is then passed to text extraction module 58.

In operation of an example that is illustrative of business vocabulary being developed, at vocabulary feeder module 44, data can be sent by noun phrase extractor module 64, (i.e., the content field) and this can be used for vocabulary suggestion for an administrator. This data can be anonymous, having no user concept. For LDAP feeder element 42, whitelisted terms are provided and, further, this can be used for personal vocabulary building, as discussed herein. In essence, this data belongs to a particular user; it is a document associated to a user. Thus, there are two distinct workflows occurring in the architecture, which processes different types of documents for different purposes.

For the business vocabulary workflow, one aspect of the architecture involves a noun phrase extraction component, which can be provided along with filtering mechanisms, and stream access counts to retrieve popular and/or new vocabulary terms. In one example implementation, involving the development of business vocabulary, the architecture can suggest words and phrases that are potential vocabulary candidates. Multi-word phrases can be given more weight than single word terms. The decision whether to include these words in the whitelist or the blacklist can rest with the vocabulary administrator. The administrator can also decide if the words should never be brought to his attention again by marking them for addition to the list of administrator stop words. This can take the form of a feedback loop, for example, from the NCP user interface to the collector/connector (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, an administrator can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer an administrator the results generated by communication system 10.

Figure 1D:
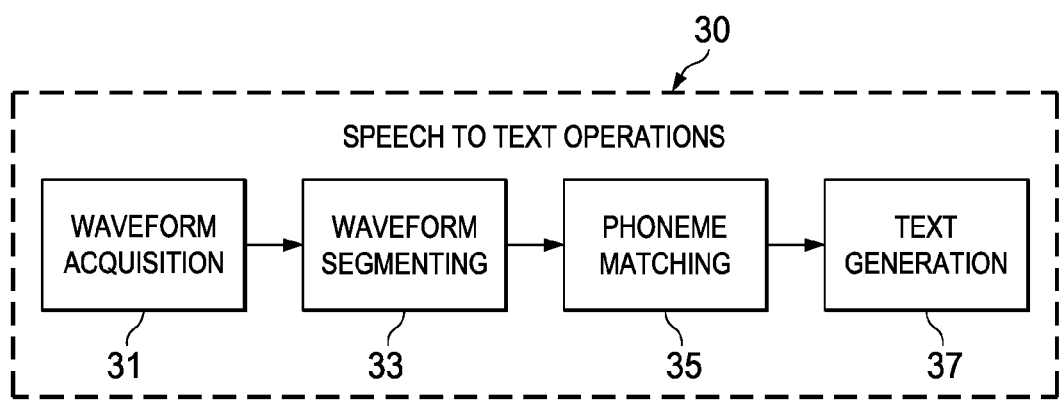
FIG. 1D is a simplified schematic diagram of speech-to-text operations that can be performed in the communication system in accordance with one embodiment.

Turning to FIG. 1D, FIG. 1D is a simplified schematic diagram illustrating a number of speech-to-text operations 30 that may occur within communication system 10. In one implementation, the speech-to-text operations 39 areis this part of text extraction module 58. FIG. 1D includes a waveform acquisition element 31, a waveform segmenting element 33, a phoneme matching element 35, and a text generation element 37. The speech-to-text conversion can include a number of stages. For example, the waveform acquisition can sample the analog audio waveform. The waveform segmentation can break the waveform into individual phonemes (e.g., eliminating laughter, coughing, various background noises, etc.). Phoneme matching can assign a symbolic representation to the phoneme waveform (e.g., using some type of phonetic alphabet). In addition, the text generation can map phonemes to their intended textual representation (e.g., using the term "meet" or "meat"). If more than one mapping is possible (as in this example), a contextual analysis can be used to choose the most likely version.

In operation, media tagging module 52 can be configured to receive a media file (video, audio, etc.) and transform that information into a text tagged file, which is further passed to a document indexing function. More specifically, and in one example implementation, there is a separate workflow that occurs before text extraction activities are performed. This separate workflow can address media files, which require some type of conversion from audio to text. For example, if a video file were to be received, audio information would be identified and, subsequently, converted to text information to identify relevant enterprise vocabulary. An audio stream can be converted to a phonetic index file (i.e., a phonetic audio track). Once the phonetic index file is created, an enterprise vocabulary can be applied to search for enterprise terms within this phonetic index file. In one instance, the enterprise vocabulary may include one or more whitelist words, which can be developed or otherwise configured (e.g., by an administrator).

Applying the enterprise vocabulary can include, for example, taking each word within the enterprise vocabulary and searching for those particular words (e.g., individually) in the audio track. For example, for an enterprise vocabulary of 1000 words, a series of application program interfaces (APIs) can be used to identify that a given word ("meet") is found at specific time intervals (T=3 seconds, T=14 seconds, T=49 seconds, etc.). The resultant could be provided as a list of 40 words (in this particular example).

This list can be checked against a personal vocabulary database, which is particular to the end user who is seeking to send, receive, upload, etc. this media file. Thus, the personal vocabulary (e.g., having 250 words) can be loaded and leveraged in order to eliminate false positives within the 40 words. This could further reduce the resultant list to 25 words. A resulting text file can be fed to text extraction module 58 for additional processing, as outlined herein.

FIG. 1E is a simplified block diagram that illustrates additional details relating to an example implementation of media tagging module 52. Media tagging module 52 may include a video-to-audio converter 72, a phoneme engine 74, a tagged file 76, a thumbnail module 92, a memory element 94, a processor 96, and a personal vocabulary database 78. A raw video file 82 can be sought to be uploaded by end user 12, and it can propagate through media tagging module 52 in order to generate tagged data with false positives removed 84. Additionally, a search module 98 is also provided in FIG. 1E and this element can interact with media tagging module 52 in order to search information that has already been intelligently filtered using the various mechanisms outlined herein. For example, a search interface could be provided (to a given end user) and the interface could be configured to initiate a search for particular subject areas within a given database. The removal of false positives can occur at an indexing time such that when an end user provides a new search to the system, the database is more accurate and, therefore, a better search result is retrieved.

In the context of one example flow, media can be extracted from HTTP streams, where it is subsequently converted to audio information. The audio track can be phonetic audio track (PAT) indexed. Appropriate tags can be generated and indexed, where thumbnails are transported and saved. Queries can be then served to the resulting database of entries (e.g., displayed as thumbnails), where relevant video and audio files can be searched. Duplicate video entries can be removed, modified, edited, etc. on a periodic basis (e.g., by an administrator, or by some other individual). In addition, the appropriate video or audio player can offer a suitable index (e.g., provided as a "jump-to" feature) that accompanies the media.

Speech recognition can be employed in various media contexts (e.g., video files, Telepresence conferences, phone voicemails, dictation, etc.). In addition, any number of formats can be supported by communication system 10 such as flash video (FLV), MPEG, MP4, MP3, WMV, audio video interleaved (AVI), MOV, Quick Time (QT) VCD, MP4, DVD, etc. Thumbnail module 92 can store one or more thumbnails on a platform that connects individual end users. The platform could be (for example) used in the context of searching for particular types of information collected by the system.

Figure 2:
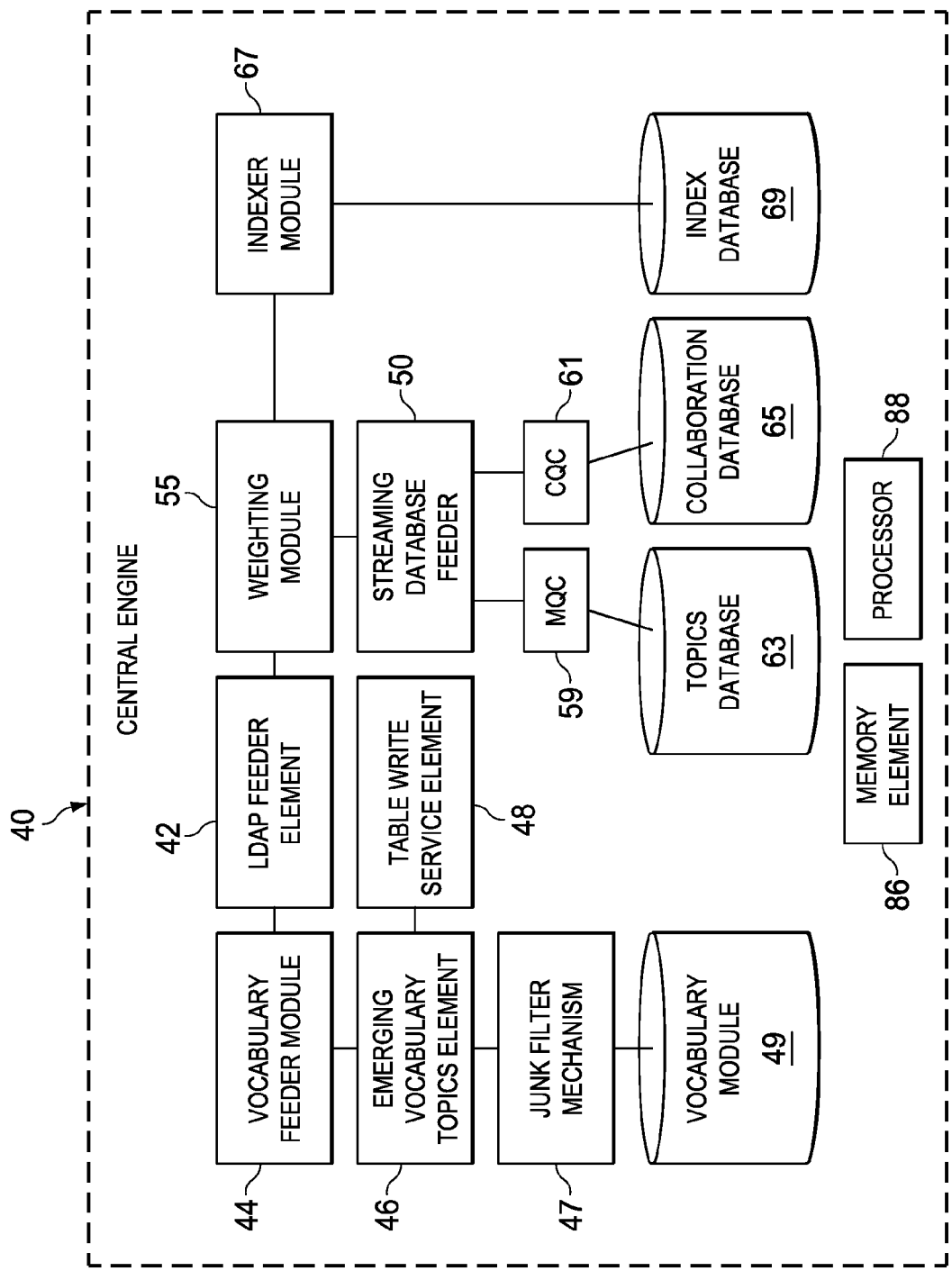
FIG. 2 is a simplified block diagram of a connector in the communication system in accordance with one embodiment.

Turning to technical details related to how the personal vocabulary is developed, FIG. 2 is a simplified block diagram of an example implementation of connector 40. Connector 40 includes a memory element 86 and a processor 88 in this particular configuration. Connector 40 also includes a junk filter mechanism 47 (which may be tasked with removing erroneous vocabulary items), a vocabulary module 49, a weighting module 55, a streaming database feeder 50, a MQC 59, a CQC 61, a topics database 63, a collaboration database 65, an indexer module 67, and an index database 69. Indexer module 67 is configured to assist in categorizing the words (and/or noun phrases) collected in communication system 10. Those indices can be stored in index database 69, which can be searched by a given administrator or an end user. Along similar reasoning, topics database 63 can store words associated with particular topics identified within the personal vocabulary. Collaboration database 65 can involve multiple end users (e.g., along with an administrator) in formulating or refining the aggregated personal vocabulary words and/or noun phrases. In regards to vocabulary module 49, this storage area can store the resultant composite of vocabulary words (e.g., per individual), or such information can be stored in any of the other databases depicted in FIG. 2. It is imperative to note that this example of FIG. 2 is merely representing one of many possible configurations that connector 40 could have. Other permutations are clearly within the broad scope of the tendered disclosure.

In operation of a simplified example used for discussion purposes, the extraction and processing operations can be performed on collector 54, where those results may be provided to connector 40 for building personal vocabulary. With respect to the initial text stripping operations, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. In addition, most search queries are noun phrases. Thus, knowing the location of the noun phrases within documents and, further, extracting them can be an important step for tagging applications.

For the end-user interface, periodically, terms can be suggested to the administrator for adding to the vocabulary. The existing interface for user-suggested vocabulary could be used for displaying the terms to the administrator. In one example implementation, a stop word removal feature can be provided on connector 40 (e.g., this could make implementation of the feedback loop more efficient). In other instances, the stop word removal feature is placed on collector 54 so that only the filtered fields are sent over to connector 40. The concept field can be accessible like other fields in the received/collected documents. The concept field is a list of string field values. Additional functionalities associated with these operations are best understood in the context of several examples provided below.

While this is occurring, in a separate workflow personal vocabulary can be developed. Thus, communication system 10 can generate personal vocabulary using corporate vocabulary, which is propagating in the network. In practical terms, it is difficult to tag all user traffic in a corporate (i.e., enterprise) environment. There are two modes in which corporate vocabulary can be generated. First, in a learning mode, where end users are not yet subscribed, automatic corporate vocabulary can be generated by tagging content as it flows through the network. This can be generated by tagging content anonymously in the network. This typically happens in the learning mode of the system, where no users are subscribed on the system. The user whose content is being tagged is not necessarily of interest at the time of corporate vocabulary generation. Second, in a real-time system scenario, as users begin using the system, users have the ability to suggest new words to the corporate vocabulary through a manual process, feedback loops, etc., which are detailed herein.

By contrast, personal vocabulary generation can use corporate vocabulary to tag words for particular users. As documents (e.g., email/http/videos, PDF, etc.) flow through the network, the system checks for words from the corporate vocabulary, tags the appropriate words (e.g., using a whitelist), and then associates those words with particular users. Communication system 10 can include a set of rules and a set of algorithms that decide whether tagged words should be added to a personal vocabulary. Rules include common term threshold, group vocabulary adjustment, etc. Over a period, the user's personal vocabulary develops into a viable representation of subject areas (e.g. categories) for this particular end user. In addition, the user has the ability to add words to his personal vocabulary manually. He also has the ability to mark individual words as public or private, where the latter would prohibit other users in the system from viewing those personal vocabulary words.

Many of these activities can be accomplished by using streaming databases in accordance with one example implementation. In one particular instance, this involves the use of streaming database feeder 50. A streaming database continuously analyzes massive volumes of dynamic information. Streaming database feeder 50 can create a user sub-stream for each user, where the tags could continuously be updated for that user. By writing a simple query, an individual can derive the most prevalent topics (e.g., based on a normalized count and time).

FIGS. 3 and 4 offer two distinct workflows for communication system 10. FIG. 3 addresses the corporate vocabulary formation, whereas FIG. 3 addresses the personal vocabulary development. It should also be noted that these illustrations are associated with more typical flows involving simplistic documents propagating in a network (e.g., email, word processing documents, PDFs, etc.).

FIG. 3 is a simplified flowchart illustrating one example operation associated with communication system 10. In this particular flow, at step 110, end user 12 has written an email that includes the content "Optical Switching is a terrific technology." This email message can traverse the network and be received at a router (e.g., a large corporate router, a switch, a switched port analyzer (SPAN) port, or some type of virtual private network (VPN) network appliance). This is reflected by step 120. Collector 54 can be provisioned at such a location in order to capture data and/or facilitate the identification of content, as described herein.

In this particular example, FIFO element 56 may receive data in a raw format at step 130. Text extraction module 58 may extract certain fields in order to identify a title, text, authorship, and a uniform resource locator (URL) associated with this particular document at step 140. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] Note that for this particular instance (where an email is being sent), the URL can have a blank field. The title may include a subject line, or an importance/priority parameter, and the text field would have the quoted statement (i.e., content), as written above. The document is then passed to blacklist 60, which searches (i.e., evaluates) the document to see if any blacklisted words are found in the document (step 150). If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by an administrator based on particular user needs. The term 'whitelist' as used herein in this Specification is meant to connote any data sought to be targeted for inclusion into the resultant composite of words for an administrator. Along similar reasoning, the term 'blacklist' as used herein is meant to include items that should not be included in the resultant composite of words.

Provided that the document in this instance is not dropped as a result of the blacklist check, the document passes to document filter 62. Document filter 62 performs a quick check of the type of document that is being evaluated at step 160. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to an administrator.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology." This is illustrated by step 170.

Once this document has propagated through noun phrase extractor module 64, the document passes to whitelist 66 at step 180. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that there are two documents being created from the original document. In one instance, document splitter element 68 can receive a document with five fields including the concept field (at step 190), and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., email) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic at step 200. In this particular arrangement, the following stop words can be removed: first name, last name, userid; functional stop word: A, an, the, etc.; email stop words: regards, thanks, dear, hi, etc.; non-alphabets: special characters, numbers; whitelist words: all words found in a whitelist file configured by the administrator; administrator stop words: administrator rejected system words. Note that the operation of filtering functional stop words is different from filtering email (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing email stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the connector side) at step 210. Vocabulary feeder module 44 forwards the document without the concept field and, for the document with the concept field, it sends it to streaming database feeder 50. In one instance, the streams are associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of connector 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow of FIG. 3, vocabulary feeder module 44 can read the concept field (e.g., created by the NLP module) and can feed the noun phrases to the raw vocabulary stream (e.g., "raw_vocab_stream" file) at step 220. The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator suggest interface 38 reads the weekly collapsed vocabulary table to display the terms at step 230. This element also suggests the top (e.g., 'n') words to an administrator for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. In case the administrator chooses the "reject term" option, the system can add the term to the list of existing stop words and, further, propagate it to collector 54 to copy over to a file (e.g., adminStopWords.txt). This is reflected by step 240. Network collaboration platform 32 can create a file from the table suggested vocabulary terms (e.g., via commands including suggestedby=system, and status=rejected). This file can be a part of the force sync files that can be pushed to the collector/connector (depending on where the stop words mechanism resides). At step 260, emerging vocabulary topics element 46 can look up emerging topics (e.g., within harvested documents) and, systematically, add the emerging and top topics to the architecture for the administrator to consider. Both options can be provided to an administrator. The emerging topics can be similar to the experience tags such that topics growing in prominence over a given time interval (e.g., a week) can be suggested to an administrator.

FIG. 4 is a simplified flowchart illustrating one example operation associated with communication system 10. In this particular flow, an email is written from a first end user (John) to a second end user (Bill) at step 210. The email from John states, "Search engines are good" and this is evaluated in the following ways. First, authorship is identified and the email is searched for blacklisted and whitelisted words at step 220. In essence, a number of text stripping operations occur for the received document (as outlined previously above in FIG. 3). Second, the whitelisted words are received at LDAP feeder element 42 at step 230. In one sense, the appropriate concept has been extracted from this email, where insignificant words have been effectively stripped from the message and are not considered further.

At step 240, John is associated with the term "search engine" based on John authoring message and, in a similar fashion, Bill is associated with the term "search engine" based on him receiving this message. Note that there is a different weight associated with John authoring this message, and Bill simply receiving it. At step 250, weighting module 55 can be invoked in order to assign an intelligent weight based on this message propagating in the network. For example, as the author, John may receive a full point of weight associated with this particular subject matter (i.e., search engines). As the recipient, Bill may only receive a half point for this particular subject matter relationship (where Bill's personal vocabulary would include this term, but it would not carry the same weight as this term being provided in John's personal vocabulary).

In addition, and as reflected by step 260, weighting module 55 may determine how common this word choice (i.e., "search engine") is for these particular end users. For example, if this were the first time that John has written of search engines, it would be inappropriate to necessarily tag this information and, subsequently, identify John as an expert in the area of search engines. This email could be random, arbitrary, a mistake, or simply a rare occurrence. However, if over a period, this terminology relating to search engines becomes more prominent (e.g., reaches a threshold), then John's personal vocabulary may be populated with this term.

In this particular example, several days after the initial email, John sends Bill a second email that includes a white paper associated with search engines, along with an accompanying video that is similarly titled. This is reflected by step 270. Connector 40 has the intelligence to understand that a higher weight should be accorded to this subsequent transmission. Intuitively, the system can understand that certain formats (White Papers, video presentations, etc.) are more meaningful in terms of associating captured words with particular subject areas. At step 280, weighting module 55 assigns this particular transmission five points (three points for the White Paper and two points for the video presentation), where the five points would be allocated to John's personal vocabulary associated with search engines. In addition, Bill is also implicated by this exchange, where he would receive a lesser point total for (passively) receiving this information. In this instance, and at step 290, Bill receives three points as being a recipient on this email. At step 300, the point totals are stored in an appropriate database on a per-user basis.

Additionally, over time, a social graph can be built based on the connection between John and Bill and, in particular, in the context of the subject area of search engines. In one sense, the weight between these two individuals can be bidirectional. A heavier weight is accorded to John based on these transmissions because he has been the dominant author in these exchanges. If Bill were to become more active and assume an authorship role in this relationship, then the weight metric could shift to reflect his more proactive involvement. In one particular example, a threshold of points is reached in order for Bill's personal vocabulary to include the term 'search engine.' This accounts for the scenario in which a bystander is simply receiving communications in a passive manner.

The architecture discussed herein can continue to amass and aggregate these counts or points in order to build a personal vocabulary (e.g., personal tags) for each individual end user. The personal vocabulary is intelligently partitioned such that each individual has his own group of tagged words to which he is associated. At the same time, a social graph can continue to evolve as end users interact with each other about certain subject areas.

In contrast to other systems that merely identify two individuals having some type of relationship, the architecture provided herein can offer the context in which the relationship has occurred, along with a weighting that is associated with the relationship. For example, with respect to the John/Bill relationship identified above, these two individuals may have their communications exclusively based on the topic of search engines. Bill could evaluate his own personal vocabulary and see that John represents his logical connection to this particular subject matter. He could also evaluate other less relevant connections between his colleagues having (in this particular example) a weaker relationship associated with this particular subject matter. Additionally, an administrator (or an end user) can construct specific communities associated with individual subject matter areas. In one example, an administrator may see that John and Bill are actively involved in the area of search engines. Several other end users can also be identified such that the administrator can form a small community that can effectively interact about issues in this subject area.

In another example, entire groups can be evaluated in order to identify common subject matter areas. For example, one group of end users may be part of a particular business segment of a corporate entity. This first group may be associated with switching technologies, whereas a second group within the corporate entity may be part of a second business segment involving traffic management. By evaluating the vocabulary exchanged between these two groups, a common area of interest can be identified. In this particular example, the personal vocabulary being exchanged between the groups reveals a common interest in the subject of deep packet inspection.

Note that one use of the resulting data is to create a dynamic file for each individual user that is tracked, or otherwise identified through communication system 10. Other applications can involve identifying certain experts (or group of experts) in a given area. Other uses could involve building categories or subject matter areas for a given corporate entity. Note also that communication system 10 could accomplish the applications outlined herein in real time. Further, the association of the end users to particular subject matter areas can then be sent to networking sites, which could maintain individual profiles for a given group of end users. This could involve platforms such as Facebook, LinkedIn, etc. The dynamic profile can be supported by the content identification operations associated with the tendered architecture. In other applications, video, audio, and various multimedia files can be tagged by communication system 10 and associated with particular subject areas, or specific end user groups. In one instance, both the end user and the video file (or the audio file) can be identified and logically bound together or linked.

Software for providing intelligent vocabulary building and visual worthiness rating functionality can be provided at various locations. In one example implementation, this software is resident in a network element, such as connector 40, NCP 32, and/or collector 54, or in another network element for which this capability is relegated. In other examples, this could involve combining connector 40, NCP 32, and/or collector 54 with an application server or a gateway, or some proprietary element, which could be provided in (or be proximate to) these identified network elements, or this could be provided in any other device being used in a given network. In one specific instance, connector 40 provides the personal vocabulary building features explained herein, while collector 54 can be configured to offer the visual worthiness rating activities detailed herein. In such an implementation, collector 54 can initially receive the data, employ its media tagging functions, and then send the results to a text extraction mechanism, which can develop or otherwise process this information such that a visual worthiness rating is generated.

In other embodiments, the visual worthiness rating features may be provided externally to collector 54, NCP 32, and/or connector 40, or included in some other network device, or in a computer to achieve these intended functionalities. As identified previously, a network element can include software to achieve the visual worthiness rating and vocabulary building operations, as outlined herein in this document. In certain example implementations, the visual worthiness rating and vocabulary building functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in some of the preceding FIGURES] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in some of the preceding FIGURES] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the vocabulary building and visual worthiness rating operations as outlined herein. Additionally, each of these devices may include a processor that can execute software or an algorithm to perform the vocabulary building and visual worthiness rating activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1A (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A computer implemented method, comprising:
   evaluating a video file in a network environment;
   determining an identity of at least one speaker associated with the video file in order to generate an identity attribute;
   performing speech to text operations associated with the video file in order to generate at least one text attribute;
   generating a visual worthiness rating based, at least, on the identity attribute and the text attribute associated with the video file, wherein the visual worthiness rating is reflective of a visual significance of image content in the video file;
   rendering the visual worthiness rating to the end user prior to the video file being played; and
   wherein an additional attribute is generated and used in formulating the visual worthiness rating, the attribute being an author attribute reflective of authorship of the video file.

2. The method of claim 1, wherein the identity of the speaker is determined using a selected one of a group of identification mechanisms, the group consisting of;
   a) speech recognition;
   b) facial detection;
   c) picture matching;
   d) subtitle information in the video file;
   e) keyword recognition; and
   f) credit identification in the video file.

3. The method of claim 1, wherein separate visual worthiness ratings are developed for particular sections of the video file.

4. The method of claim 1, wherein preferences of the end user are evaluated in order to generate an alert to be sent to the end user for a particular file that matches at least some of the preferences.

5. The method of claim 1, wherein an alert is sent to the end user to provide a recommendation for adjusting screen space allocations for particular sections of the video file.

6. The method of claim 1, wherein weights are assigned to particular attributes discovered in video data propagating in network traffic, the weights being used to generate additional visual worthiness ratings for additional video files.

7. The method of claim 1, wherein timestamps of the video file are captured in order to alert a particular user of specific sections of the video file having a particular visual worthiness rating.

8. The method of claim 1, further comprising:
   receiving a search query that includes a particular attribute sought to be identified within a plurality of video files; and
   retrieving at least some of the plurality of video files based on a presence of the particular attribute.

9. The method of claim 1, wherein relationships associated with the end user are evaluated in order to recommend particular video files for viewing by the end user.

10. The method of claim 1, wherein user engagement is tracked for a particular video file in order to provide a visual worthiness rating for the particular video file.

11. Logic encoded in one or more non-transitory media that includes code for execution and when executed by a processor is operable to perform operations comprising:

evaluating a video file in a network environment;
determining an identity of at least one speaker associated with the video file in order to generate an identity attribute;
performing speech to text operations associated with the video file in order to generate at least one text attribute;
generating a visual worthiness rating based, at least, on the identity attribute and the text attribute associated with the video file, wherein the visual worthiness rating is reflective of a visual significance of image content in the video file;
rendering the visual worthiness rating to the end user prior to the video file being played; and
wherein an additional attribute is generated and used in formulating the visual worthiness rating, the attribute being an author attribute reflective of authorship of the video file.

12. The logic of claim 11, wherein separate visual worthiness ratings are developed for particular sections of the video file.

13. The logic of claim 11, wherein preferences of the end user are evaluated in order to generate an alert to be sent to the end user for a particular file that matches at least some of the preferences.

14. The logic of claim 11, wherein user engagement is tracked for a particular video file in order to provide a visual worthiness rating for the particular video file.

15. The logic of claim 11, wherein an alert is sent to the end user to provide a recommendation for adjusting screen space allocations for particular sections of the video file.

16. An apparatus, comprising:
a memory element configured to store data;
a processor operable to execute instructions associated with the data;
a connector configured to interface with the memory element and the processor, wherein the apparatus is configured for:
evaluating a video file in a network environment;
determining an identity of at least one speaker associated with the video file in order to generate an identity attribute;
performing speech to text operations associated with the video file in order to generate at least one text attribute;
generating a visual worthiness rating based, at least, on the identity attribute and the text attribute associated with the video file, wherein the visual worthiness rating is reflective of a visual significance of image content in the video file;
rendering the visual worthiness rating to the end user prior to the video file being played; and
wherein the additional attribute is generated and used in formulating the visual worthiness rating, the attribute being an author attribute reflective of authorship of the video file.

17. The apparatus of claim 16, wherein separate visual worthiness ratings are developed for particular sections of the video file.

18. The apparatus of claim 16, wherein preferences of the end user are evaluated in order to generate an alert to be sent to the end user for a particular file that matches at least some of the preferences.

19. The apparatus of claim 16, wherein timestamps of the video file are captured in order to alert a particular user of specific sections of the video file having a particular visual worthiness rating.

* * * * *